United States Patent [19]
Soga et al.

[11] Patent Number: 5,936,927
[45] Date of Patent: *Aug. 10, 1999

[54] DISK DRIVE APPARATUS WITH INSULATORS TO MINIMIZE EXTERNAL VIBRATIONS

[75] Inventors: Ryo Soga; Yoshikazu Ishimatsu; Toshiro Ota; Takuji Shimoda, all of Kanagawa, Japan

[73] Assignee: Sony Corporation, Tokyo, Japan

[*] Notice: This patent is subject to a terminal disclaimer.

[21] Appl. No.: 08/953,619

[22] Filed: Oct. 17, 1997

Related U.S. Application Data

[60] Continuation of application No. 08/614,387, Mar. 12, 1996, Pat. No. 5,737,304, which is a division of application No. 08/425,155, Apr. 19, 1995, abandoned.

[30] Foreign Application Priority Data

Apr. 25, 1994 [JP] Japan .................................. 6-107490
May 25, 1994 [JP] Japan .................................. 6-133970

[51] Int. Cl.$^6$ .................................................. G11B 33/08
[52] U.S. Cl. ........................................................ 369/75.1
[58] Field of Search ................................ 369/75.1, 247, 369/248, 263; 360/97.02

[56] References Cited

U.S. PATENT DOCUMENTS

| | | | |
|---|---|---|---|
| 2,820,853 | 1/1958 | Dally | 179/100.41 |
| 3,556,537 | 1/1971 | Stacy | 274/23 |
| 4,005,858 | 2/1977 | Lochner | 267/136 |
| 4,121,379 | 10/1978 | Everson | 49/61 |
| 4,562,566 | 12/1985 | Eisemann | 369/75.2 |
| 4,633,973 | 1/1987 | Kitano | 181/207 |
| 4,661,868 | 4/1987 | Tezuka | 360/96.6 |
| 4,722,439 | 2/1988 | Grobecker et al. | 206/309 |
| 4,731,777 | 3/1988 | Yoshitoshi et al. | 369/263 |
| 4,747,000 | 5/1988 | Godsoe | 360/96 |
| 4,787,005 | 11/1988 | Tezuka et al. | 360/130.2 |
| 4,812,932 | 3/1989 | Hishinuma et al. | 360/97.01 |
| 4,922,478 | 5/1990 | Verhagen | 369/247 |
| 5,084,861 | 1/1992 | Takahashi | 369/291 |
| 5,247,496 | 9/1993 | Yamatani | 369/13 |
| 5,261,534 | 11/1993 | Krebs et al. | 206/310 |
| 5,329,504 | 7/1994 | Mukawa | 369/13 |
| 5,347,507 | 9/1994 | Kuhn | 369/263 |
| 5,355,357 | 10/1994 | Yamamori et al. | 369/75.2 |
| 5,366,200 | 11/1994 | Scura | 248/632 |
| 5,379,990 | 1/1995 | Ando et al. | 267/34 |
| 5,432,660 | 7/1995 | Kono et al. | 360/96.6 |
| 5,450,377 | 9/1995 | Eom | 369/13 |

FOREIGN PATENT DOCUMENTS

| | | |
|---|---|---|
| 0288126 A1 | 10/1988 | European Pat. Off. . |
| 0583946 A1 | 2/1994 | European Pat. Off. . |
| 1797242 | 10/1977 | Germany . |
| 59-5401 | 1/1984 | Japan . |
| 61-32279 | 2/1986 | Japan . |
| 62-146478 | 6/1987 | Japan . |
| 62-64989 | 3/1990 | Japan . |
| 5-303877 | 11/1993 | Japan . |
| 640376 | 7/1950 | United Kingdom . |

*Primary Examiner*—George J. Letscher
*Attorney, Agent, or Firm*—Limbach & Limbach L.L.P.

[57] ABSTRACT

In a disk drive apparatus for driving a CD or CD-ROM having a disk tray with a recess, the recess is provided with a plurality of pawls that keep the disk stable when it is loaded in the recess and the apparatus is vertical. In this way, unexpected contact of the outer circumference of the disk with the outer circumference of the recess is avoided. The recess is moreover provided with insulators that fully allow deformation or displacement of a base unit in one direction, but minimize it in other directions. External vibrations acting on the apparatus when it is vertical are therefore effectively damped, and rotation of the disk in the apparatus is steady.

9 Claims, 36 Drawing Sheets

FIG. 2A
FIG. 2B
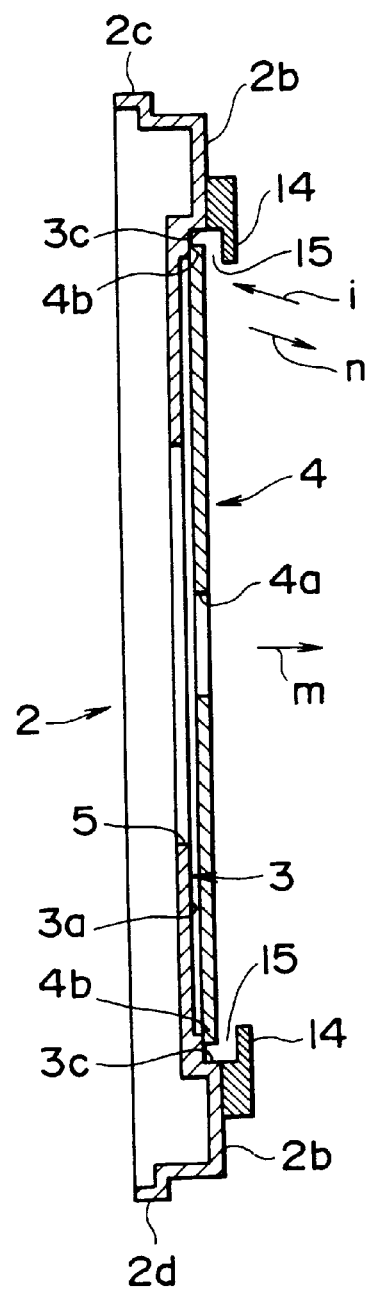
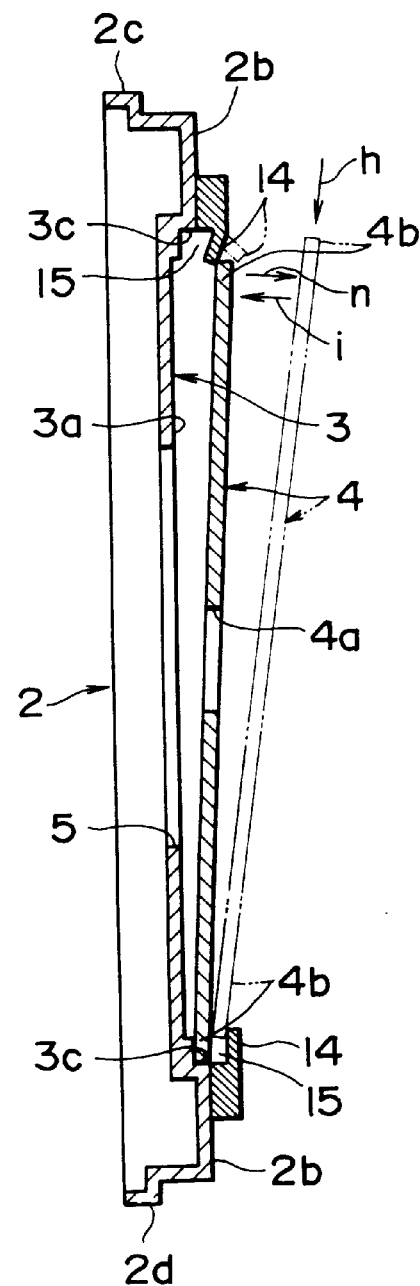

F I G. 5A
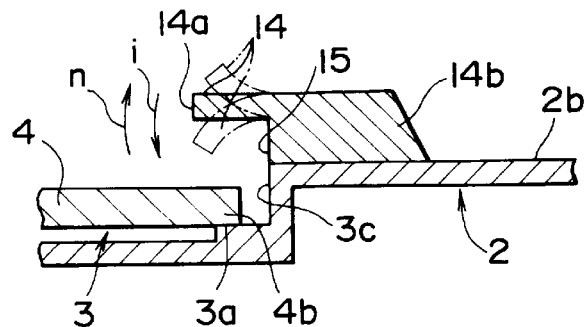
F I G. 5B
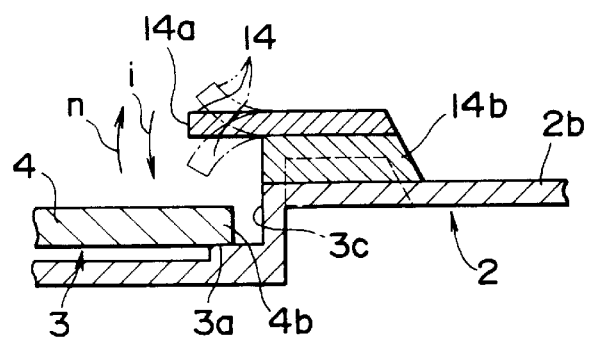
F I G. 5C
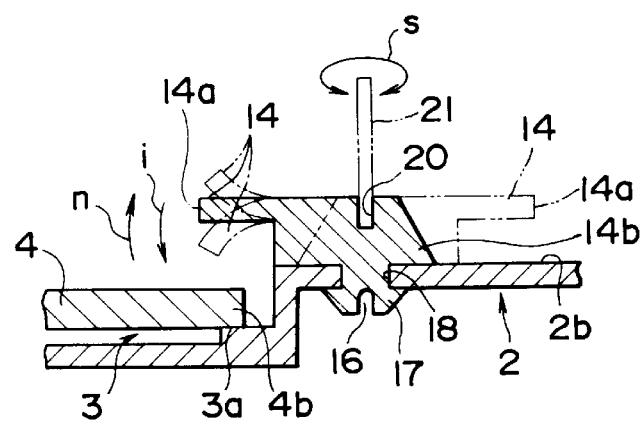

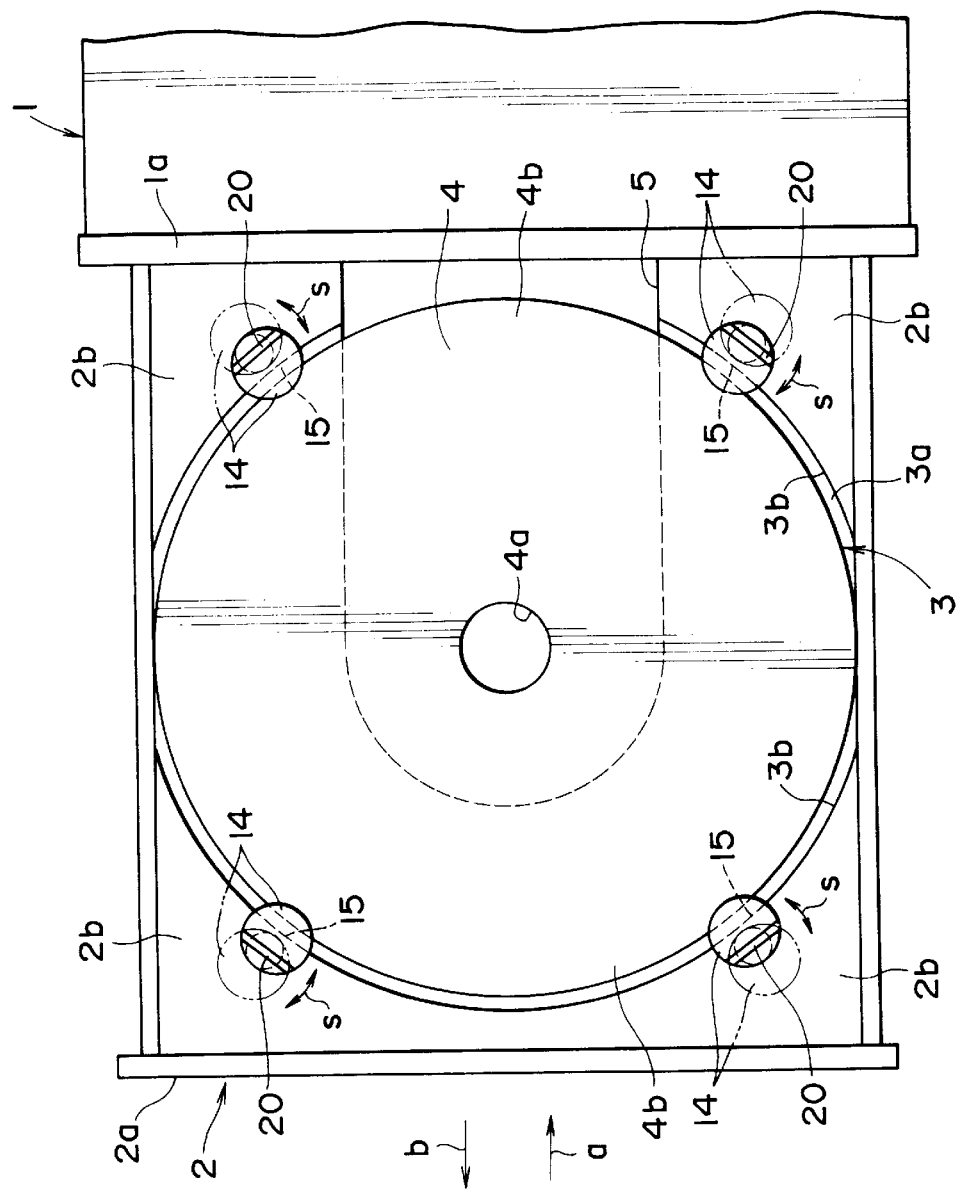

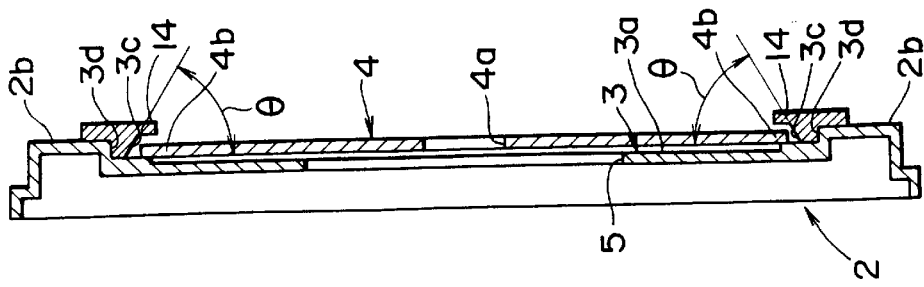
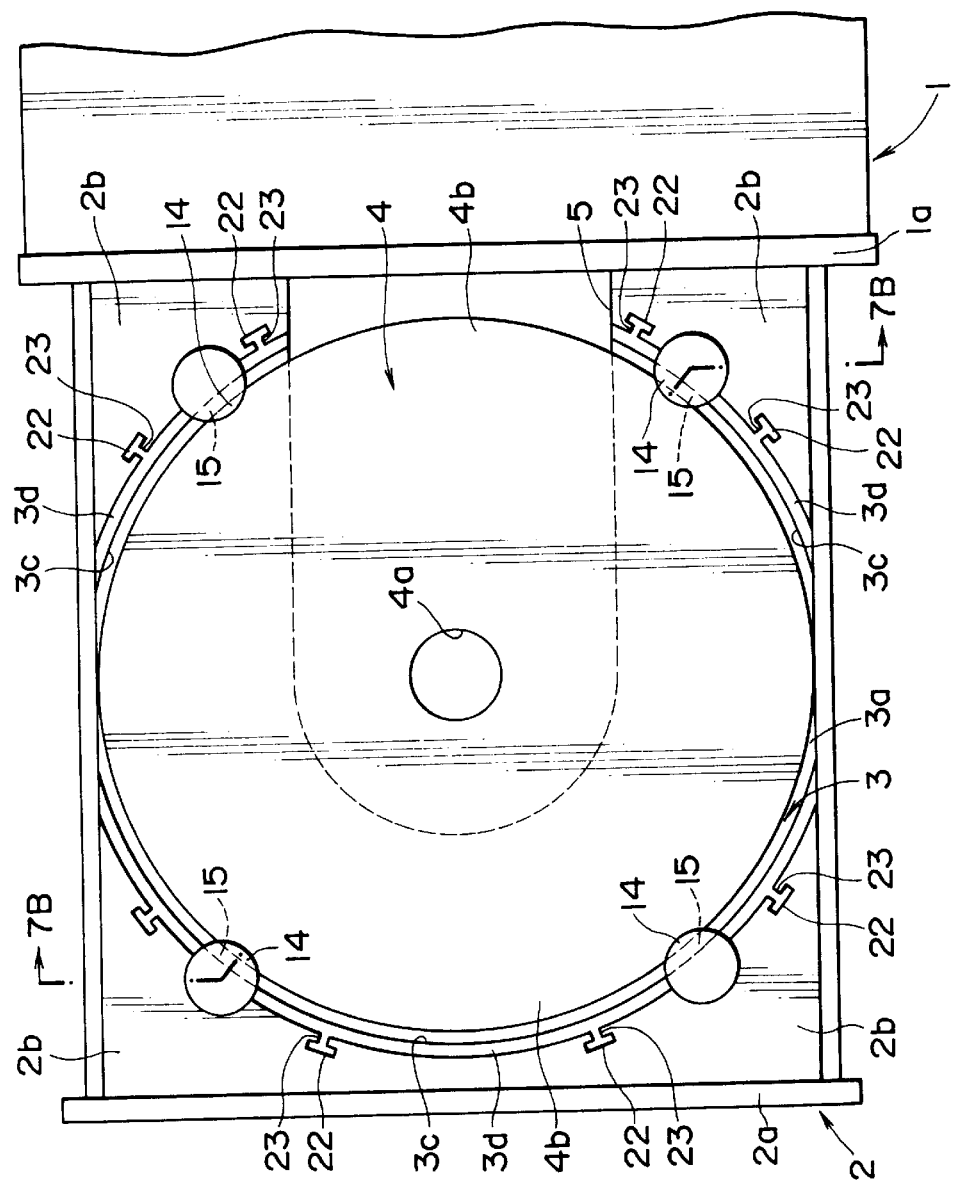

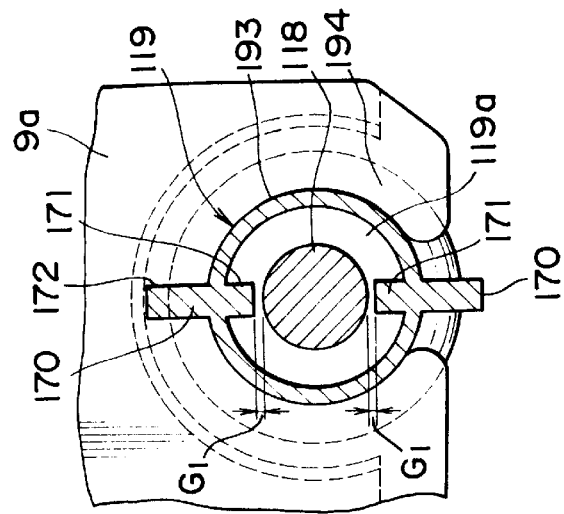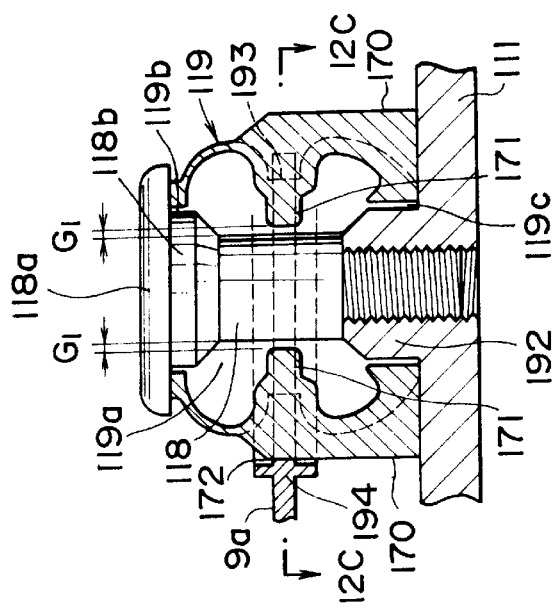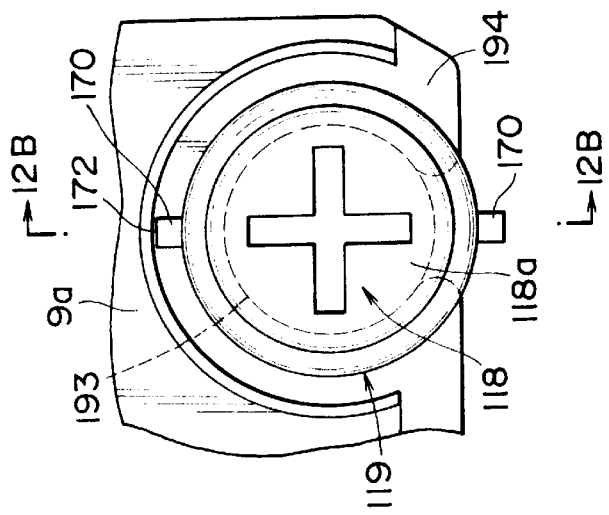

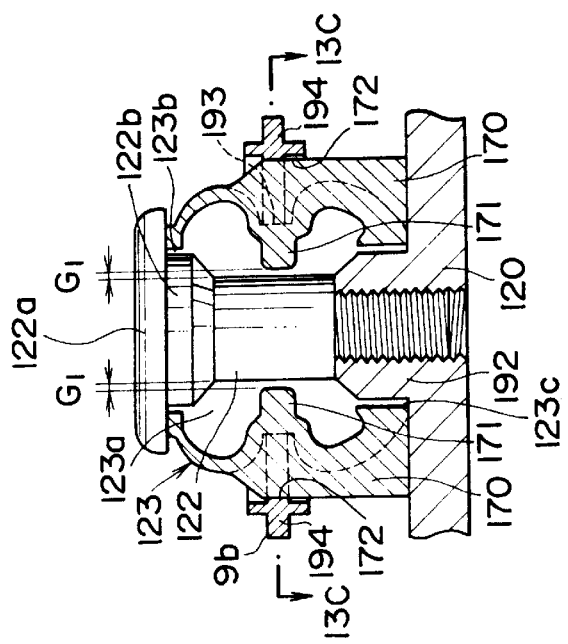
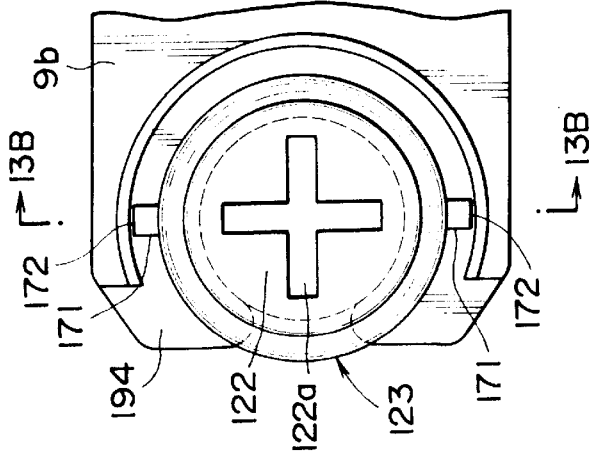
FIG. 13A  FIG. 13B  FIG. 13C

F I G. 14A
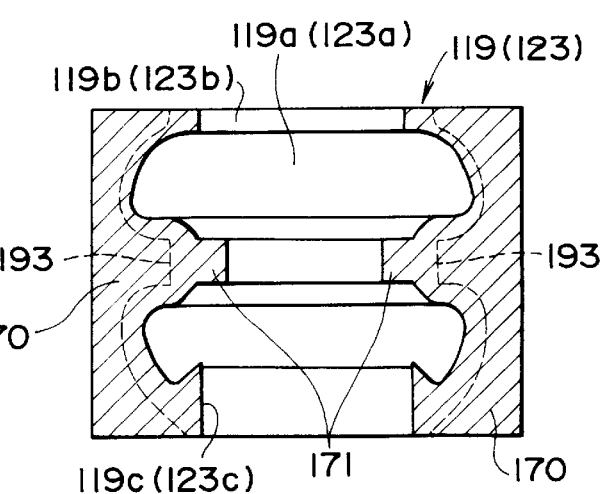
F I G. 14B
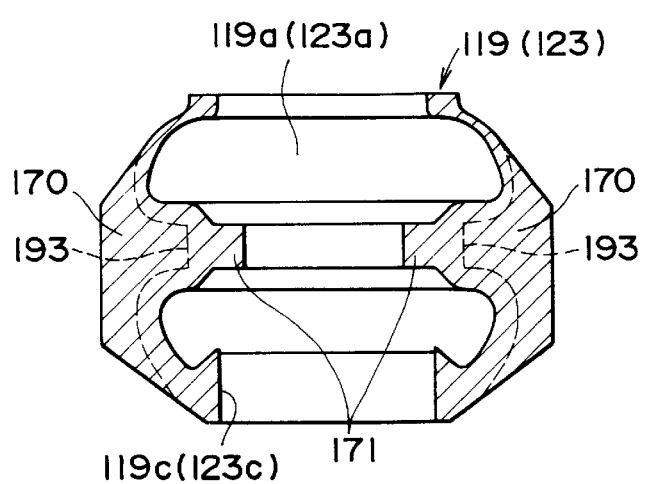
F I G. 14C
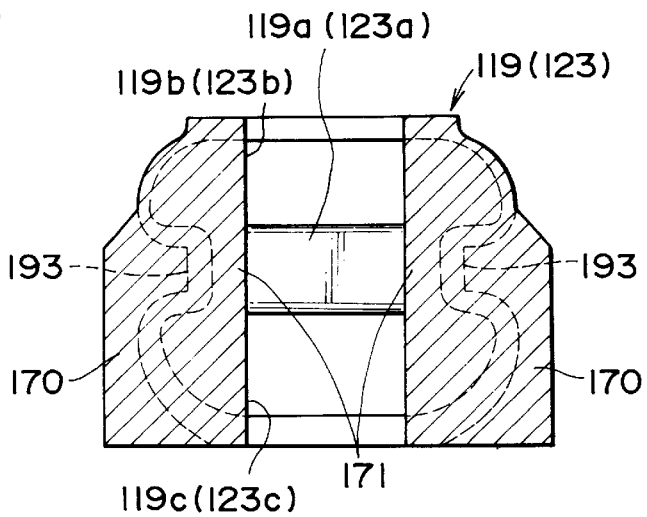

FIG. 17
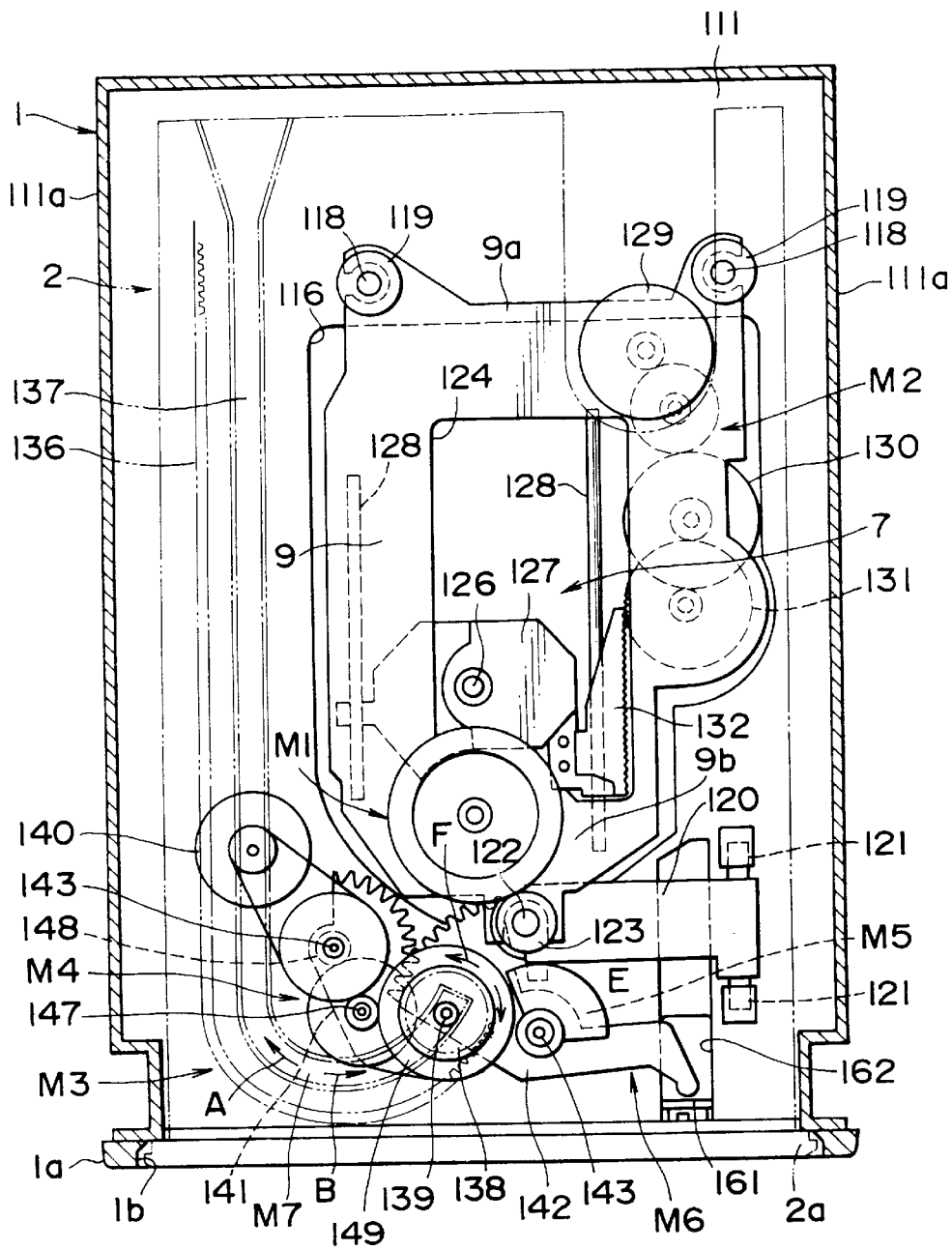
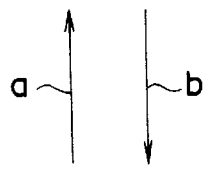

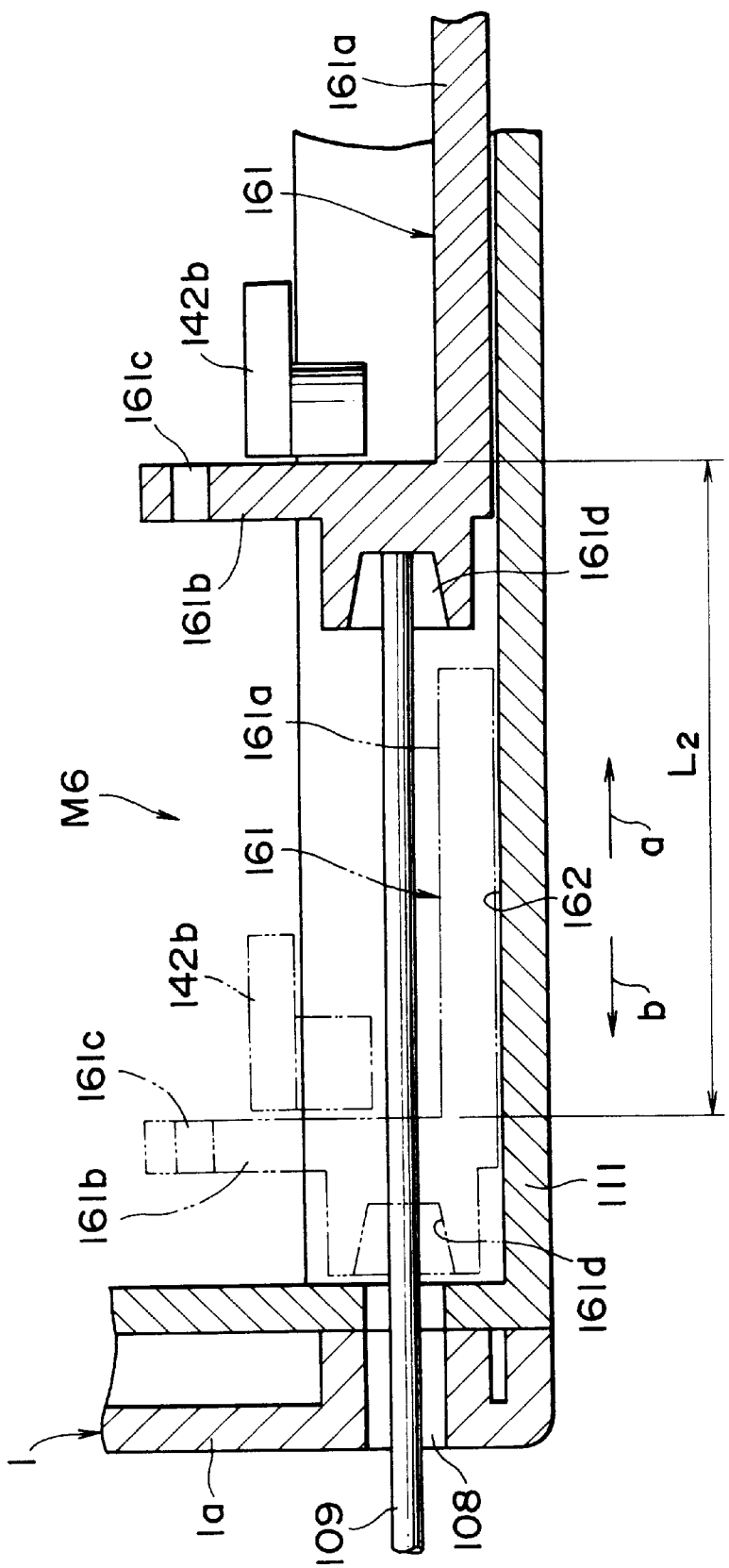

F I G. 33
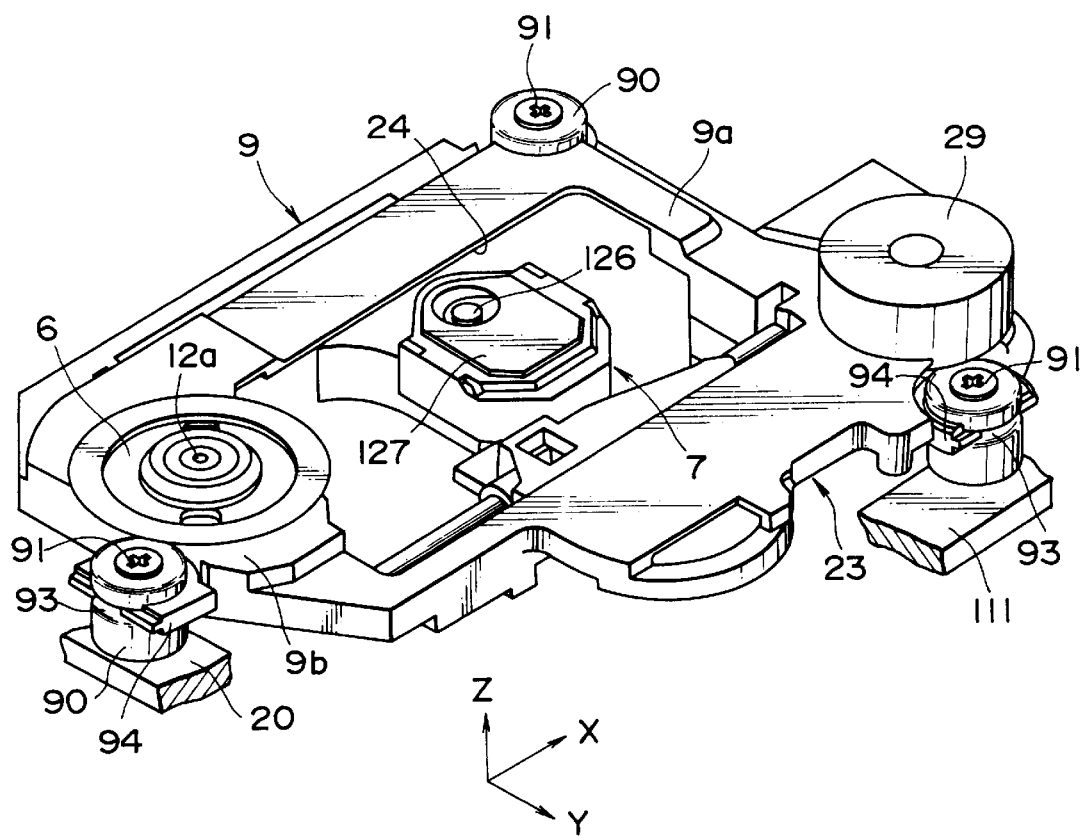

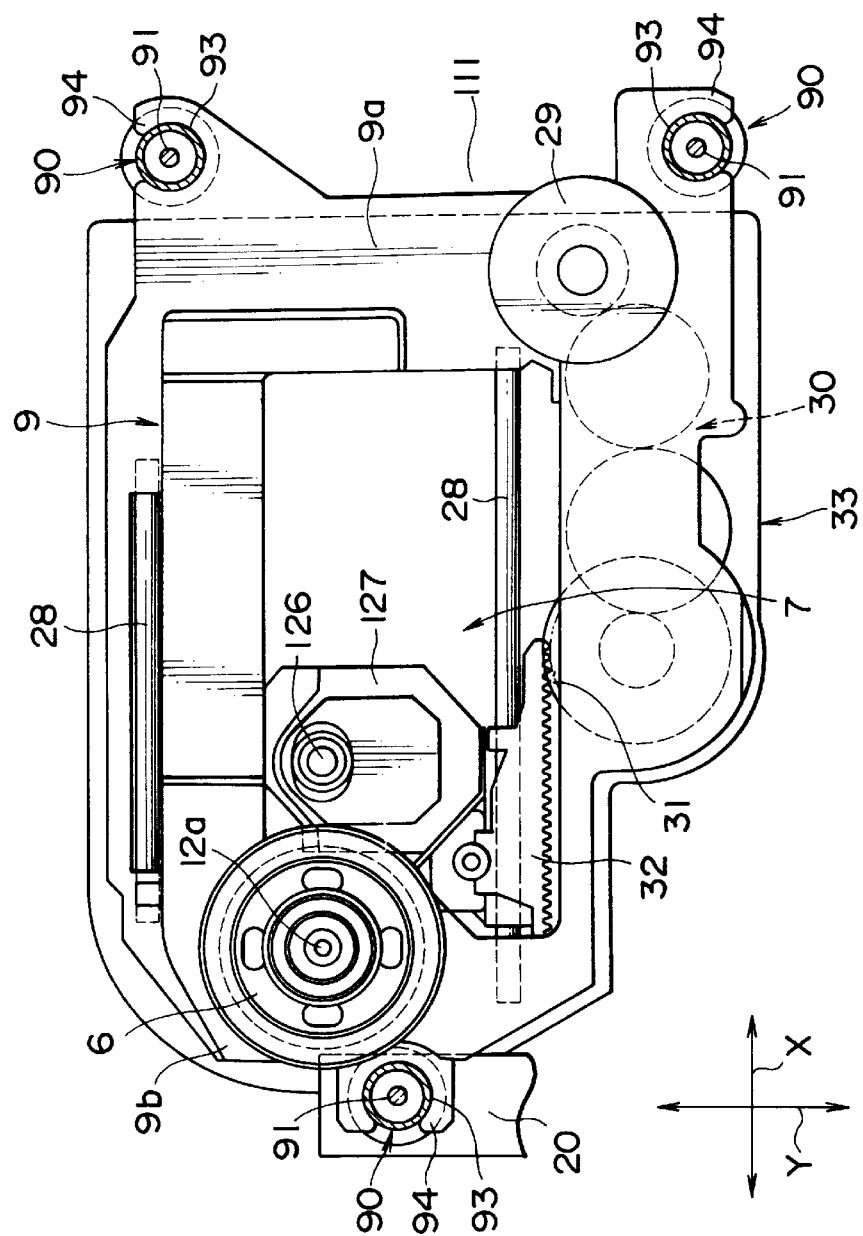

DISK DRIVE APPARATUS WITH INSULATORS TO MINIMIZE EXTERNAL VIBRATIONS

This is a continuation of Application Ser. No. 08/614,387, filed Mar. 12, 1996, U.S. Pat. No. 5,737,304, which is a divisional of U.S. patent application Ser. No. 08/425,155, filed Apr. 19, 1995, now abandoned in favor of a File Wrapper Continuation Application Ser. No. 08/779,429 filed Jan. 7, 1997, U.S. Pat. No. 5,793,729.

BACKGROUND OF THE INVENTION

1. Field of the Invention

This invention relates to a disk apparatus such as a CD player or CD ROM drive. More particularly, it relates to a device for mounting a recording and/or playback disk on a disk tray, and loading it in a disk apparatus. Still further, it relates to a damper for a frame to which a disk table and optical pickup are attached.

2. Description of Related Art

In disk apparatuses such as CD players or CD ROM drives, a horizontal opening is formed in the body of the apparatus that is shaped like a flat box, the apparatus being provided with a disk tray that can be freely inserted in the opening or removed from it, A front panel to close the opening is formed in a one-piece construction with the disk tray. An effectively circular recess 3 is formed in an upper surface 2b of a disk tray 2, as shown in FIG. 36A. A disk 4 for recording and/or playback, for example an optical or opto-magnetic disk such as a CD or CD-ROM, is inserted in the recess 3, mounted on a base 3a, and the disk 4 is then loaded horizontally in the disk apparatus by means of the tray 2.

A notch 5 is formed running from the center of the recess 3 of the tray 2 in the loading direction. A disk table, optical pickup and chucking pulley are installed in upper and lower positions inside the body of the disk apparatus.

When the disk tray is ejected outside the disk device, the disk table and optical pickup in the apparatus are retracted underneath the tray 2 around a pivot support by a base unit. The chucking pulley is supported by a pulley holder.

When the tray 2 has been loaded in the disk apparatus, the base unit is rotated about the pivot support. The disk table and optical pickup are inserted in the notch 5 in the tray 2 from underneath, a conical centering piece in the disk table engages with a center hole 4a in the disk 4 from underneath the disk, and the disk 4 is thereby lifted above the base 3a of the recess 3 of the tray 2. Simultaneously, chucking of the disk 4 is performed between the chucking pulley and disk table, and the optical pickup is brought close to the underside of the disk 4.

The disk 4 is then rotated together with the disk table by a spindle motor, and an object lens of the optical pickup tracks the disk 4 in a radial direction so as to perform recording and/or playback of the disk 4.

In this type of disk apparatus, the base unit was elastically supported in the apparatus by a damping device. However, this conventional disk apparatus was designed exclusively for horizontal operation, the disk 4 being mounted and loaded horizontally on the base 3a of the recess 3 of the disk tray 2. The apparatus was not suited to vertical operation.

As shown in FIG. 36B, if the disk tray 2 and body of the apparatus are in a vertical position, the recess 3 is then vertical, so the disk 4 slips under its own weight off a taper surface 3b of the outer circumference of the recess 3 in the direction e when it is attempted to mount the disk 4 in the recess 3.

However, in the CD-ROM drive industry, there is an increasing desire to use such disk apparatuses vertically in an effort to make use of narrow spaces due to the increasing compactness of computers.

SUMMARY OF THE INVENTION

To satisfy this need, this invention therefore aims to provide a disk apparatus that may freely be used in a horizontal, or in two vertical, directions by adding an extremely simple construction to the apparatus.

It is a further object of the invention to provide a disk apparatus that is fully protected against external shocks by a damping effect (shock resistance), and wherein contact of the disk with the disk tray and focusing errors are prevented when the apparatus is used vertically.

BRIEF DESCRIPTION OF THE DRAWINGS

FIG. 2A is a side view in section taken along a line A—A in FIG. 1 of the disk tray in the apparatus according to the first embodiment of this invention. FIG. 2B is a side view in section, similar to that of FIG. 2A, of a disk tray according to a second embodiment of this invention.

FIGS. 5A, 5B, and 5C are side views in section showing three different structures of a pawl.

FIG. 6 is a plan view of a disk tray in a disk apparatus according to a third embodiment of this invention.

FIG. 7A is a plan view of a disk in a disk apparatus according to a fourth embodiment of this invention. FIG. 7B is a side view in section taken along a line 7B—7B of FIG. 7A.

FIG. 12A is a plan view of an insulator supporting one edge of the aforesaid base unit. FIG. 12B is a view in section along a line 12B—12B of FIG. 12A, FIG. 12C is a view in section along a line 12C—12C of FIG. 12B.

FIG. 13A is a plan view of an insulator supporting another edge of the aforesaid base unit. FIG. 13B is a view in section along a line 13B—13B of FIG. 13A, FIG. 13C is a view in section along a line 13C—13C of FIG. 13B.

FIG. 14A is a side view in section showing one modification of the aforesaid insulator.

FIG. 14B is a side view in section showing an alternative modification of the aforesaid insulator. FIG. 14C is a side view in section showing another alternative modification of the aforesaid insulator.

FIG. 17 is a partial cutaway plan view of the whole body of a disk apparatus according to this invention for the purpose of illustrating the state when disk chucking is complete.

FIG. 23 is a side view in section along a line 23—23 of FIG. 21 for the purpose of describing an emergency eject operation of the disk apparatus according to this invention.

FIG. 33 is a perspective view illustrating the insulators of the disk apparatus according to this invention.

FIG. 34 is a partial cutaway plan view of FIG. 33.

DETAILED DESCRIPTION OF THE PREFERRED EMBODIMENTS

Figure 1:
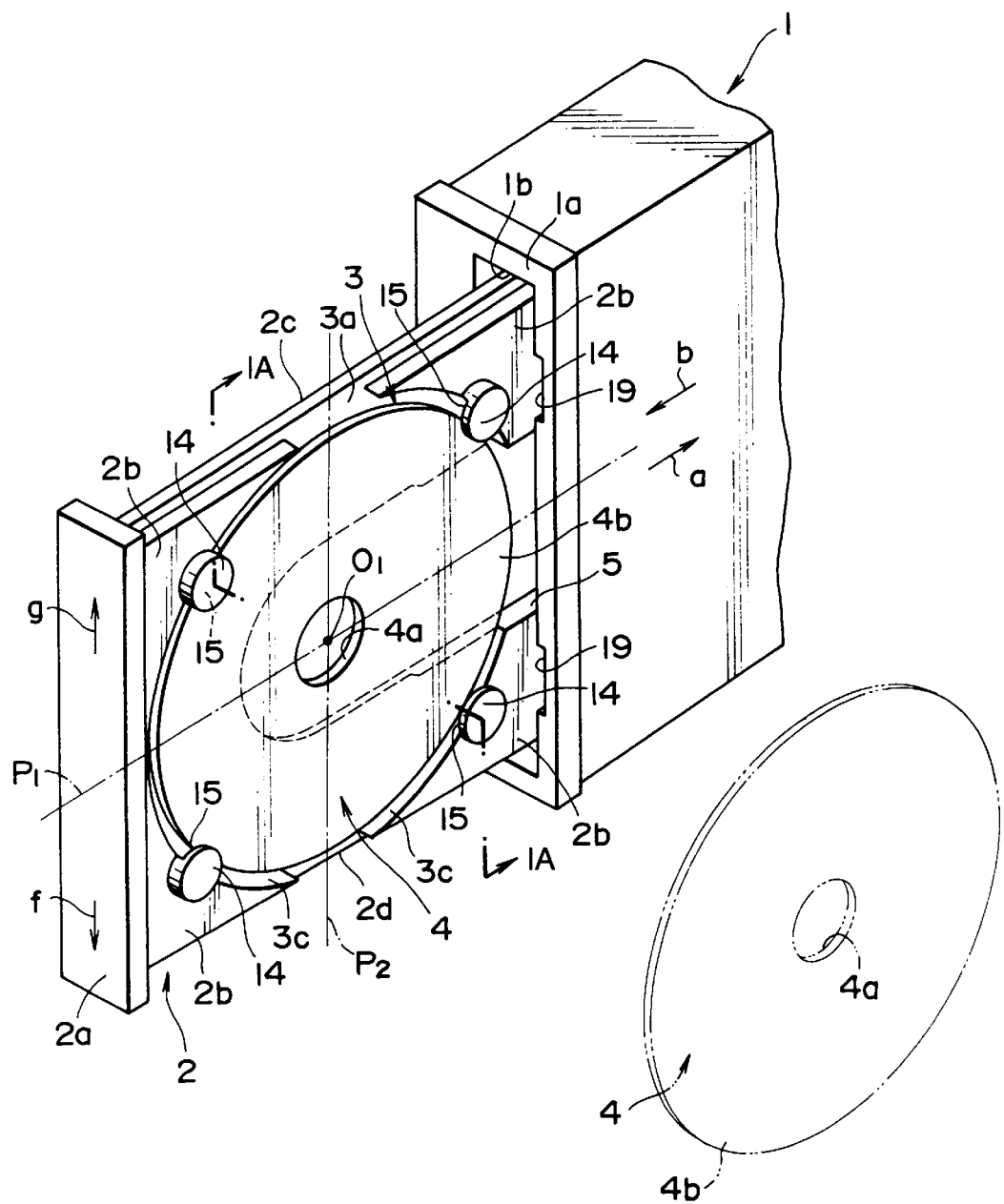
FIG. 1 is a view in perspective showing a disk tray of a disk apparatus in the ejected state when used vertically according to a first embodiment of this invention.

Specific embodiments of a disk apparatus to which this invention has been applied, will now be described with reference to FIG. 1–FIG. 35.

First Embodiment of Disk Tray

A first embodiment of a disk tray will be described with reference to FIG. 1, FIG. 2A, FIG. 3 and FIG. 4.

First, an outer circumferential surface 3c of a recess 3 of a disk tray 2 is formed effectively in the shape of a right-angled cylindrical surface with respect to a base 3a.

Next, four effectively plate-like pawls 14 are provided on an upper surface 2b of the tray 2 on the outer circumference of the recess 3 of the tray 2. About half of these pawls 14 extend parallel to the base 3a from the outer circumferential surface 3c of the recess 3 towards the center $O_1$ of the recess 3, pockets 15 which are hollows being formed between these pawls 14 and the base 3a.

Figure 4:
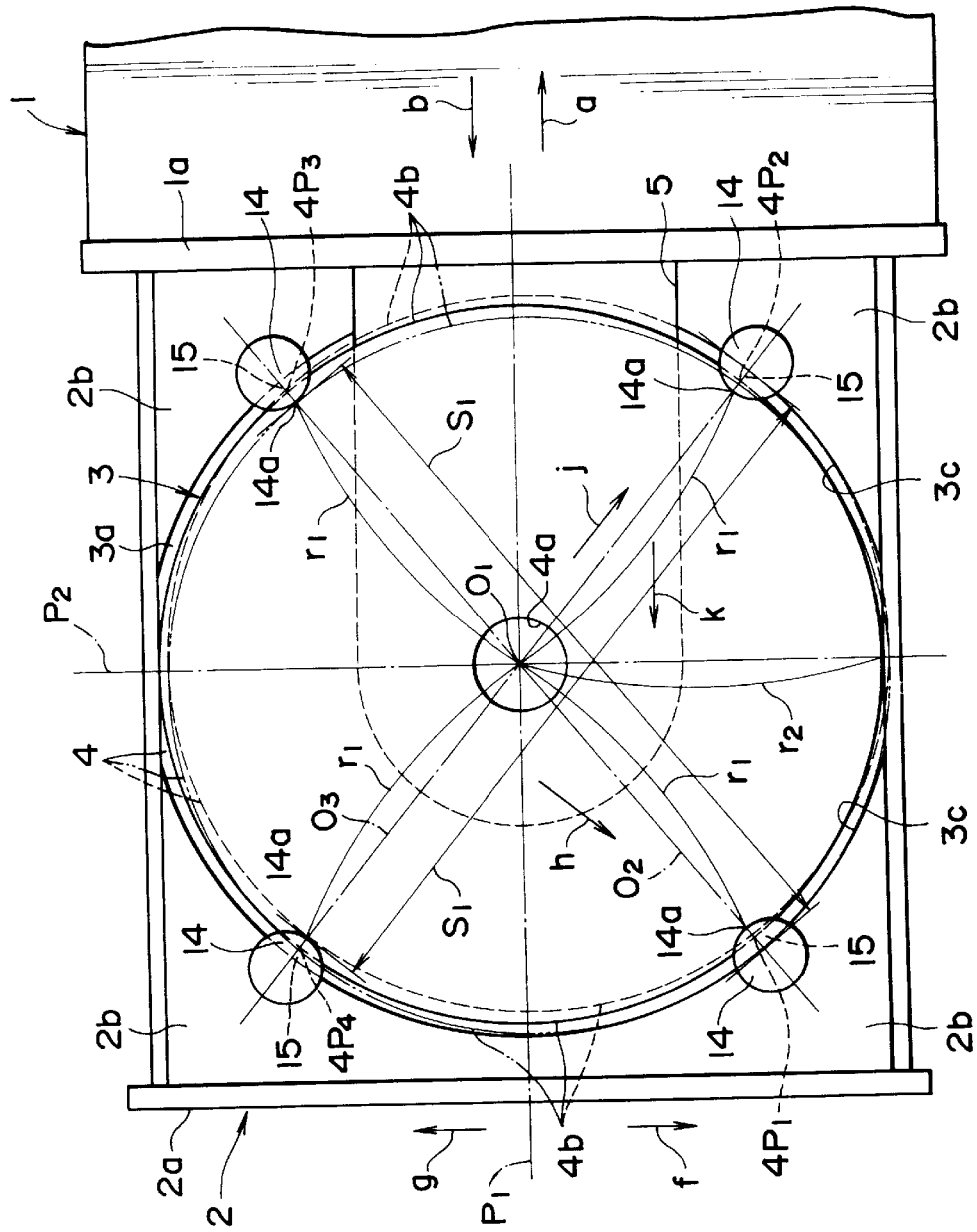
FIG. 4 is a plan view of said disk tray according to the first embodiment of this invention.

These four pawls 14 are provided at four positions that are symmetrical with respect to a center line $P_1$ in directions f, g in the width direction, and a center line $P_2$ in directions a, b in the length direction, of the disk tray 2, as shown in FIG. 4.

The radius $r_1$ from the center $O_1$ of the recess 3 to mutually opposite inner edges 14a of the four pawls 14, is arranged to be less than the radius $r_2$ of the disk 4. Further, an interval $S_1$ from the inner edge 14a of one of the pawls 14 on the two diagonals $O_2$, $O_3$ joining the centers of the four pawls 14 to the outer circumferential surface 3c on the opposite side of the recess 3 from the center $O_1$, is arranged to be slightly greater than the diameter ($2r_2$) of the disk 4.

The four pawls 14 may be formed in a one-piece construction with the tray 2 from a synthetic resin. Alternatively, the pawls 14 may be formed separately from the tray 2, and attached thereto by an adhesive, by screws, or by inserting lugs 17 with slots 16 into fixing holes 18 formed in the upper surface 2b of the tray 2, as shown in FIG. 5C.

According to this first embodiment, the disk 4 is inserted in the recess 3 of the tray 2 by sliding the disk into the recess in zig-zag fashion between the four pawls 14.

In other words, as shown by the dot-and-dash line in FIG. 4, the disk 4 is inserted in the recess 3 from the direction h, and the lower left and lower right points $4P_1$, $4P_2$ on the outer circumference 4b of the disk 4 are inserted in the pockets 15 in the lower left and lower right pawls 14 in FIG. 4.

The lower left point 4P of the outer circumference 4b of the disk 4 is brought into contact from the direction h with the outer circumferential surface 3b of the recess 3 on one of the diagonals $O_2$, and after pushing the upper right point $4P_3$ on the outer circumference of the disk 4 into the upper right pawl 14 in a direction i in FIG. 2, the disk 4 is moved in a direction j along the other diagonal $O_3$ so as to insert the upper right point $4P_3$ on the outer circumference 4b of the disk 4 into the pocket 15 inside the upper right pawl 14, as shown by the dotted line in FIG. 4.

The lower right point $4P_2$ on the outer circumference 4b of the disk 4 then comes in contact from the direction j with the outer circumference 3b of the recess 3 on the other diagonal $O_3$, and the upper left point $4P_4$ on the circumference 4b of the disk 4 is pushed in the direction i in FIG. 2 into the upper left pawl 14.

Finally, the disk 4 is moved in a direction k parallel to the base 3a of the recess 3, and the upper left point $4P_4$ on the outer circumference 4b of the disk 4 is inserted in the pocket 15 inside the upper left pawl 14 until the center of the disk 4 coincides with the center line $P_2$ as shown in FIG. 4.

When the disk 4 is removed from the recess 3 of the tray 2, the disk 4 is slid out of the four pawls 14 in a zigzag fashion in a reverse operation to the above.

However, if it is simply attempted to pull the disk 4 out in a direction m in FIG. 2 parallel to the base 3a of the recess 3, the four pawls 14 catch on the outer circumference 4b of the disk 4, so the disk 4 cannot be removed from the recess 3.

According to this disk apparatus, therefore, as shown by FIG. 1 and FIG. 2A, a body 1 and the disk tray 2 of the disk apparatus can be used not only horizontally, but also vertically. When the apparatus is used vertically, either one of the two edges 2c, 2d in the width direction of the tray 2 may be in the lower position, so vertical use actually implies two directions.

When the apparatus is used vertically, the disk 4 inserted in the recess 3 is maintained stable and is firmly held in its vertical position by the four pawls 14. Hence, the disk 4 cannot fall in a direction n of FIG. 2A out of the recess 3.

While the disk 4 is maintained stable in its vertical position in the recess 3, it may be loaded or ejected in the directions a, b in the body 1 by means of the tray 2 of the disk apparatus.

Further, the outer circumference 3c of the recess 3 is formed effectively perpendicular to the base 3a. When the apparatus is used vertically, therefore, the outer circumference 3c is horizontal, and the disk 4 can therefore be held in the recess 3 very stably.

A pair of notches 19 are also formed in an opening 1b of a front panel 1a of the body 1 of the disk apparatus.

Second Embodiment of the Disk Tray

Next, a second embodiment of the disk tray will be described with reference to FIG. 2B, FIG. 5A and FIG. 5B.

According to the second embodiment, as shown in FIG. 5A, one of the pawls 14, two of the pawls 14 on the two diagonals $O_2$, $O_3$ shown in FIG. 4, or all of the pawls 14, are constructed of an elastic material such as rubber.

In this case, a base 14b of one of the pawls 14 is also formed of a elastic material such as rubber in a one-piece construction with the pawl 14, and the pawl 14 is attached to the upper surface 2b of the tray 2 by adhesive or a screw via this base 14b as shown in FIG. 5A, or by means of the lug 17 as shown in FIG. 5C.

Alternatively, the pawl 14 may be attached to the upper surface 2b of the tray 2 by adhesive or a screw via the base 14b formed separately from the pawl 14 as shown in FIG. 5B, or by means of the lug 17 as shown in FIG. 5C. In this case, moreover, the base 14b may be formed in a one-piece construction with the upper surface 2b of the tray 2.

According to this second embodiment, the disk 4 may be simply inserted in the recess 3 by, for example, inserting the underside of the outer circumference 4b of the disk 4 obliquely in the direction h into a pocket 15 in a lower pawl 14, and pushing the upper side of the outer circumference 4b of the disk 4 from the direction i into a pocket 15 in an upper pawl 14 in the recess 3 so as to bend the upper pawl 14 in the direction i against the elastic force.

In this case, the disk 4 may be inserted in the recess 3 also by first bending the pawl 14 elastically in the direction n opposite to the direction 1.

According to this second embodiment, the apparatus may be used in three orientations, i.e. in the horizontal direction and two vertical orientations as in the case of the first embodiment.

Third Embodiment of the Disk Tray

Next, a third embodiment of the disk tray will be described with reference to FIG. 5C and FIG. 6.

According to this third embodiment, one of the pawls 14, two of the pawls 14 on the two diagonals $O_2$, $O_3$ shown in FIG. 4, or all of the pawls 14, are free to rotate in a direction s about the base 14b as shown in FIG. 5C. In this case, the pawl 14 or pawls 14 may be constructed of a synthetic resin or of rubber.

The pawl 14 may then be moved between a position wherein the pawl 14 enters the recess 3 as shown by the solid lines in FIG. 5C and FIG. 6, and a position wherein the pawl 14 lies outside the recess 3 as shown by the dot-and-dash lines in FIG. 5C and FIG. 6, by providing a coin slot 20 in the upper surface of the base 14b of the pawl 14 and inserting a coin 21 or the like to turn the pawl 14 through 180°.

According to the third embodiment, therefore, when the body 1 and tray 2 of the disk apparatus are used horizontally, the pawls 14 may be moved outside the recess 3 so that they do not interfere when the disk 4 is inserted in the recess. When the body 1 and tray 2 of the disk apparatus are used vertically, on the other hand, the pawls 14 are moved into the recess 3 so that disk 4 is held firmly in the recess.

The pawls 14 may also be moved in a straight line along the two diagonals $O_2$, $O_3$ shown in FIG. 4 between a position where they are inside the recess 3, and a position where they are outside the recess 3.

Fourth Embodiment of Disk Tray

A fourth embodiment of the disk tray will now be described with reference to FIG. 7.

According to the fourth embodiment, a plurality of outer peripheral walls 3d that constitute the outer circumferential surface 3c of the recess 3 are respectively formed of an elastic material such as rubber in a one-piece construction with one or two pawls 14. These walls 3d are provided with a plurality of hooks 22 that press fit into a plurality of fixing slots 23 formed in the upper surface of the tray 2, so that the walls 3d can be attached to or removed from their positions on the outer circumference of the recess 3 of the tray 2 together with the pawls 14.

According to the fourth embodiment, the outer circumference 4b of the disk 4 inserted in the recess 3 is safely protected by the outer peripheral walls 3d that have elasticity, and the outer circumferential surface 3c forms an acute angle θ with the base 3a so that the disk 4 is held with even greater stability and reliability when it is used in a vertical position.

Internal Construction of Disk Apparatus

Next, the internal construction of the disk apparatus will be described with reference to FIG. 8–FIG. 35.

Disk Apparatus Loading and Ejection

First, the essential features of loading and ejection of a disk 4 in a disk apparatus will be described with reference to FIG. 1, FIG. 3, FIG. 29 and FIG. 30.

This disk apparatus has the function of playing back the disk 4 for recording and/or playback, for example an optical or optomagnetic disk such as a CD or CD-ROM. The disk 4 has a center hole 4*a*. In this case, the disk 4 has a diameter of approx. 12 cm (more precisely, 120±0.3 mm).

The body 1 of the disk apparatus is formed in the shape of a flat box having the front panel 1*a* with the horizontal opening 1*b*. The disk tray 2 is horizontally loaded into the body 1 in a loading direction a, and horizontally ejected from the body 1 in an ejection direction b, from this opening 1*b*.

As described hereintofore, the disk 4 is mounted on the recess 3 of the tray 2, and the disk 4 is loaded in the body 1 in the direction a, and ejected from the body 1 in the direction b, by means of the tray 2.

An eject button 107, and an emergency eject hole 108, are provided on the lower side of the front panel 1*a*.

Disk Loading

Figure 3:
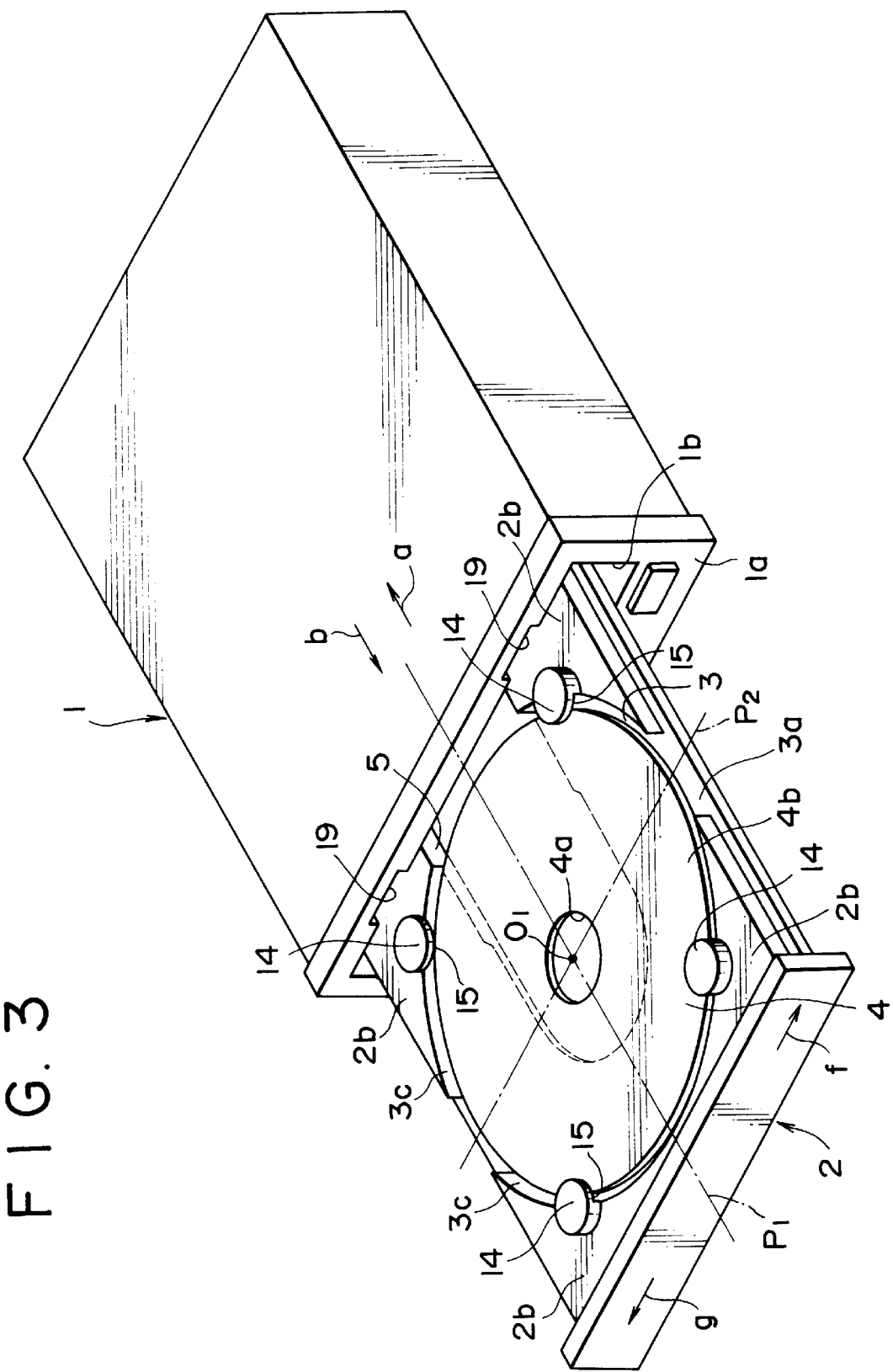
FIG. 3 is a view in perspective showing said disk tray according to the first embodiment of this invention in the ejected state when said tray is used horizontally.

To load the disk 4, the disk 4 is inserted and held in the recess 3 of the tray 2 as described for FIG. 1 or FIG. 3. When a front panel 2*a* of the loading tray 2 is pushed in the direction a, a loading switch, not shown, is switched ON, and the tray 2 is power loaded in the direction a into the body 1, as shown in FIG. 29 or FIG. 30, by a disk tray drive mechanism to be described hereinafter.

Disk Ejection

Figure 29:
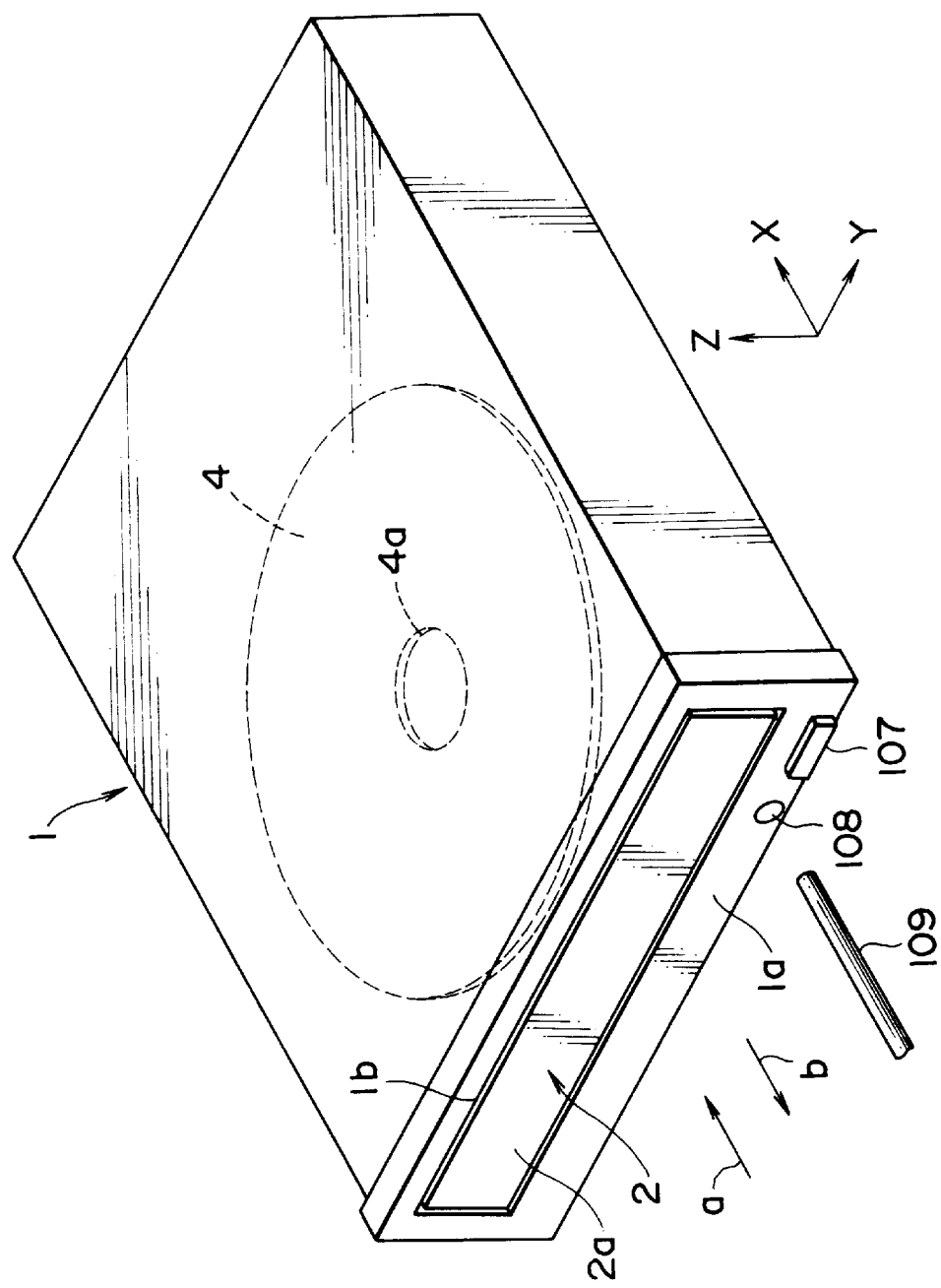
FIG. 29 is a perspective view illustrating the coordinates of an external vibration acting on the body of the disk apparatus according to this invention when the apparatus is used horizontally.
Figure 30:
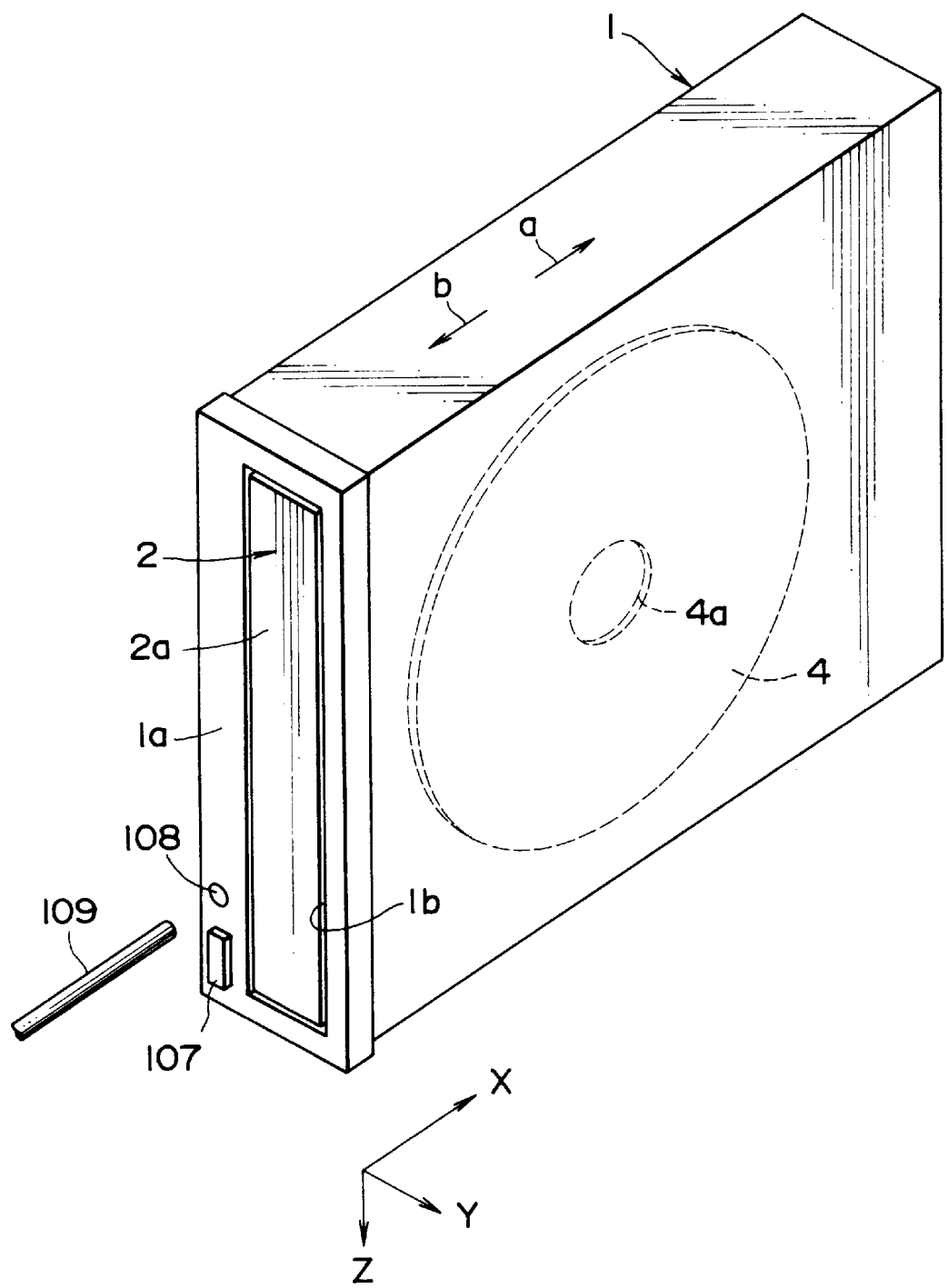
FIG. 30 is a perspective view illustrating the coordinates of an external vibration acting on the body of the disk apparatus according to this invention when the apparatus is used vertically.
Figure 31:
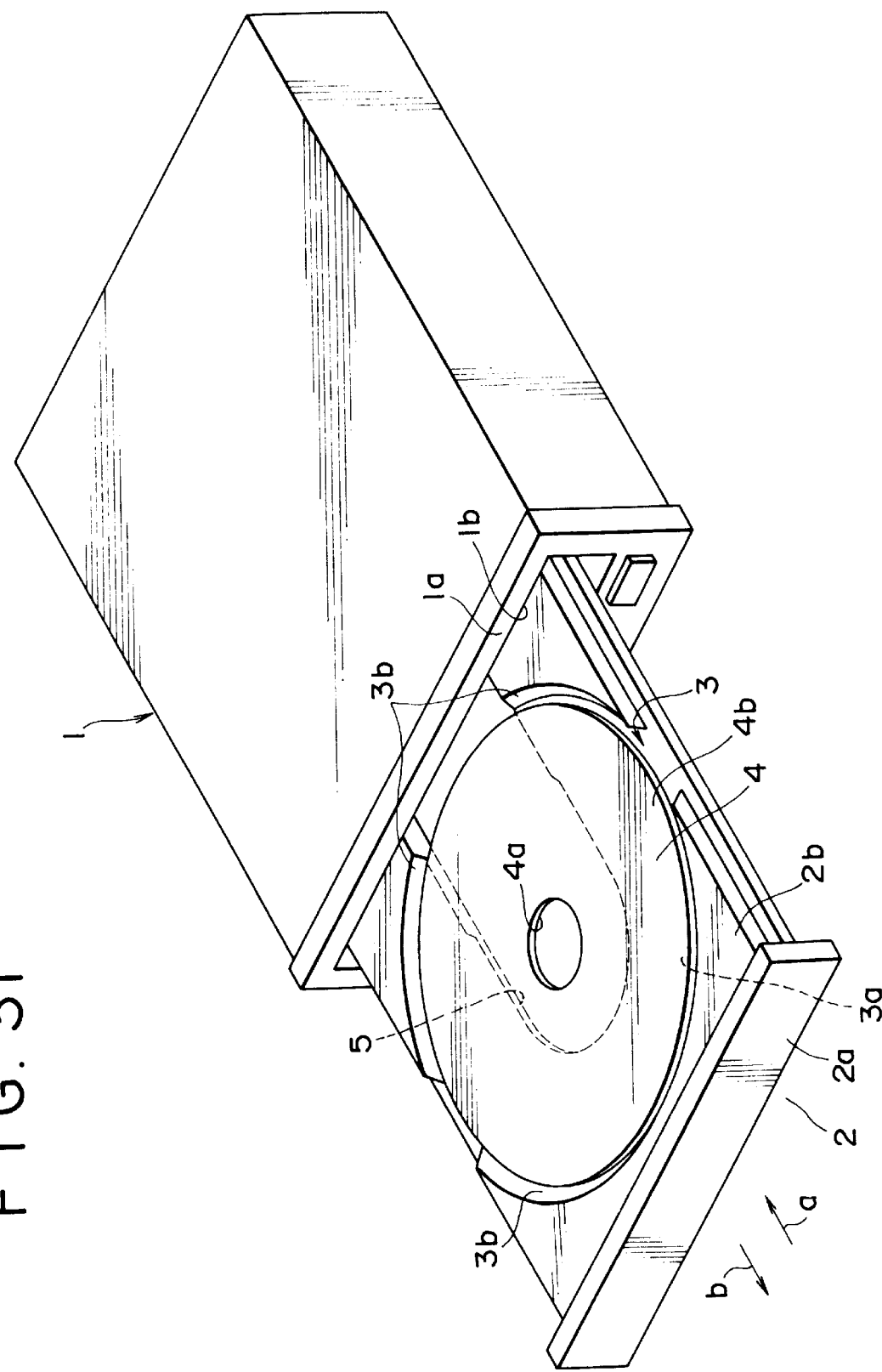
FIG. 31 is a perspective view of the ejected state of the disk tray of the disk apparatus according to this invention when the apparatus is used horizontally.
Figure 32:
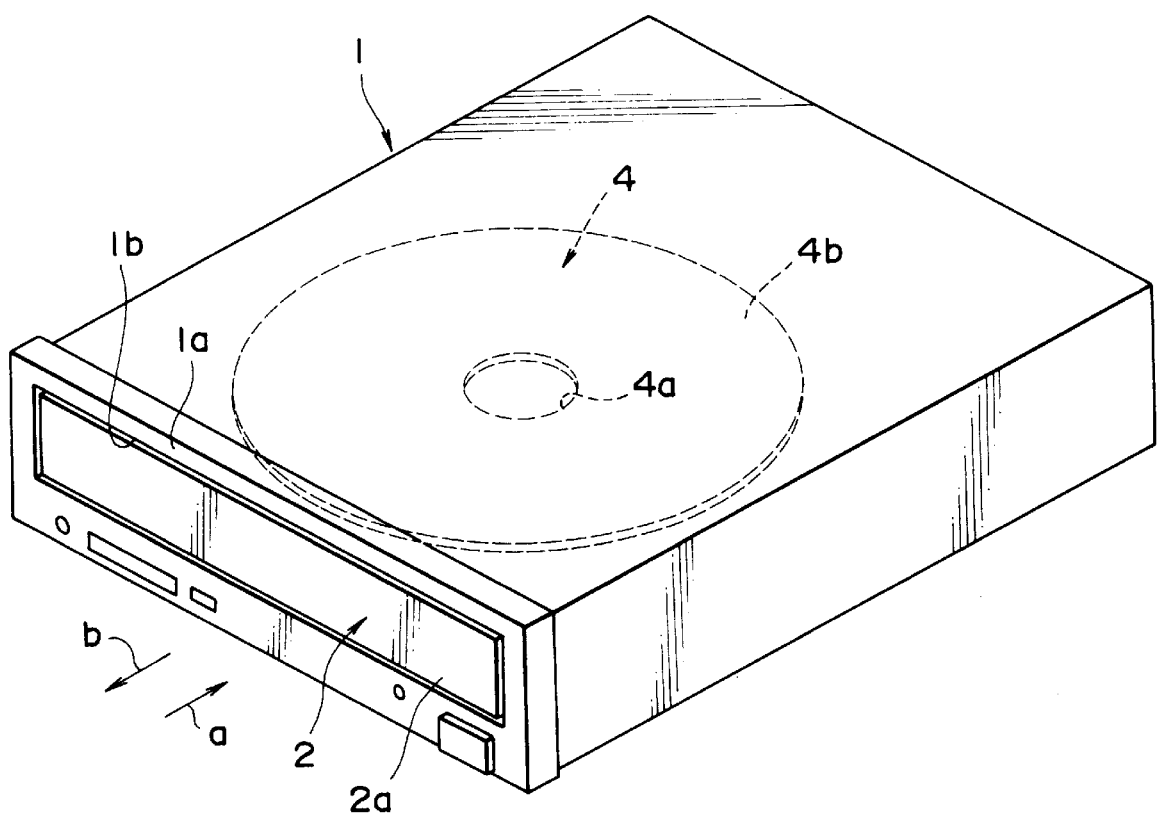
FIG. 32 is a perspective view showing the state of the disk, when loading is complete, of the disk apparatus according to this invention when the apparatus is used horizontally.

To eject the disk 4 when the disk 4 is loaded as shown in FIG. 29 or FIG. 30, the eject button 107 is pressed so that an eject switch, not shown, is switched ON, or an eject signal is issued by a host computer. This activates the disk tray drive mechanism to be described hereinafter so that the tray 2 is power ejected in the direction b from the body 1 as shown in FIG. 1 or FIG. 3.

Emergency Eject

Figure 15:
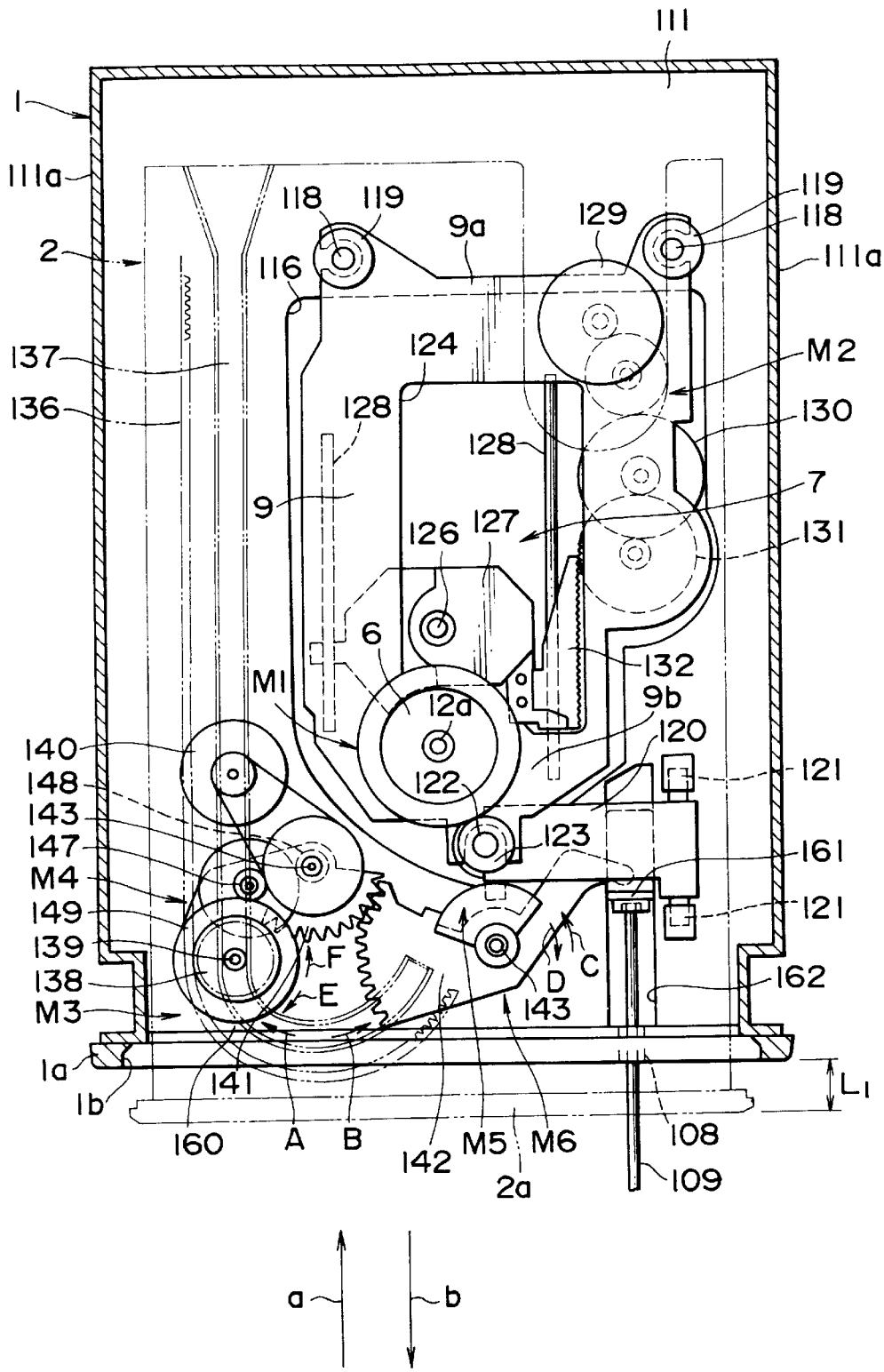
FIG. 15 is a partial cutaway plan view showing the whole body of the disk apparatus according to this invention for the purpose of illustrating the emergency eject operation of the apparatus.

When the disk 4 is loaded as shown in FIG. 29 or FIG. 30, an emergency such as a power failure or electrical fault may occur so that power cannot be supplied to the apparatus. To emergency eject the disk 4, an emergency eject piece 109 shaped like a wire object such as a clip is inserted in the direction a into the eject hole 108 in the front panel 1*a* of the body 1. An emergency eject mechanism, to be described hereinafter, then operates so that the tray 2 is ejected in the direction b from the body 1 of the disk apparatus by a certain distance $L_1$ (FIG. 15). The front panel 2*a* of the tray 2 is then grasped, and the tray 2 is withdrawn manually in the direction b.

Disk Apparatus Body

Next, the construction of the body 1 of the disk apparatus will be described with reference to FIG. 24–FIG. 30.

The body 1 of this disk apparatus comprises the front panel 1*a* and the chassis 111 constructed from a synthetic resin or the like, and a case shaped like a flat box formed of an upper and lower cover 112, 113 formed from stainless steel sheet. A printed board 114 is installed horizontally between the lower part of the chassis 111 and the lower cover 113. A pair of horizontal left and right guide rails 115 formed in a one-piece construction along the two edges 2*c*, 2*d* in the width direction of the tray 2, are free to slide in a pair of horizontal left and right guide grooves 196 formed on the inside of left and right walls 111*a* of the chassis 111.

Disk Chucking Mechanism

A disk chucking mechanism M1 provided inside the body 1 of the disk apparatus will now be described with reference to FIG. 15–FIG. 17, and FIG. 24–FIG. 26.

This disk chucking mechanism M1 comprises a disk table 6 rotated by a spindle 12*a* of a spindle motor 12, and chucking pulley 8.

A pulley holder 11 is suspended horizontally between the upper edges of the left and right side walls 111*a* of the chassis 111 in an upper position in the space for inserting the tray 2. The chucking pulley 8 is freely engaged in a circular holder hole 11*a* formed in the middle part of the holder 11 such that it can move within certain limits in an up/down direction and a horizontal direction. A metal sheet 8*a* such as an aluminum sheet is horizontally embedded in the middle of the chucking pulley 8, and a flange 8*b* formed in a one-piece construction with the outer circumference of the upper edge of the pulley 8 comes into contact with the top of a flange 11*b* formed in a one-piece construction with the lower edge of the inner circumference of the holder hole 11*a* so that the flange 8*b* is suspended at a higher position than the loaded disk 4.

An effectively longitudinal opening 116 is formed approximately in the middle of the chassis 111, a base unit 9 being disposed inside this opening 116. The left and right sides of an end 9*a* in the direction a of the base unit 9 are supported by two insulators 119 formed of rubber or the like that are fixed to the chassis 111 by means of a pair of left and right fixing screws 118.

A unit base drive lever 120 is disposed perpendicular to the directions a, b on the chassis 111 at the end of the opening 116 in the direction b. This lever 120 is formed of a synthetic resin or the like, and it is attached such that it is free to rotate up or down in the directions c, d above the chassis 111 on a pair of horizontal pivot axes 121 parallel to the directions a, b formed in a one-piece construction with one of its ends. The middle of the end 9*b* in the direction b of the base unit 9 is supported by means of an insulator 123 formed of rubber or the like that is fixed to a tip 120*a* of the lever 120 by means of a fixing screw 122.

Figure 25:
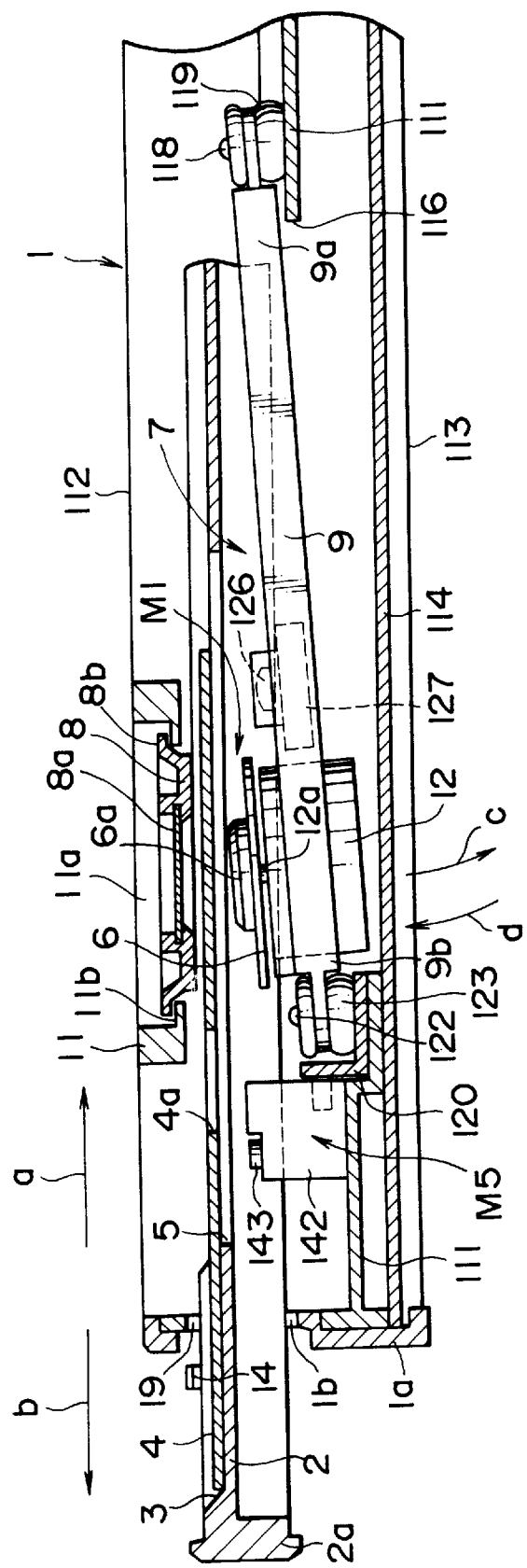
FIG. 25 is a view in section along a line 25/26—25/26 of FIG. 24 showing the chucking release state of a disk chucking mechanism of the disk apparatus according to this invention.
Figure 26:
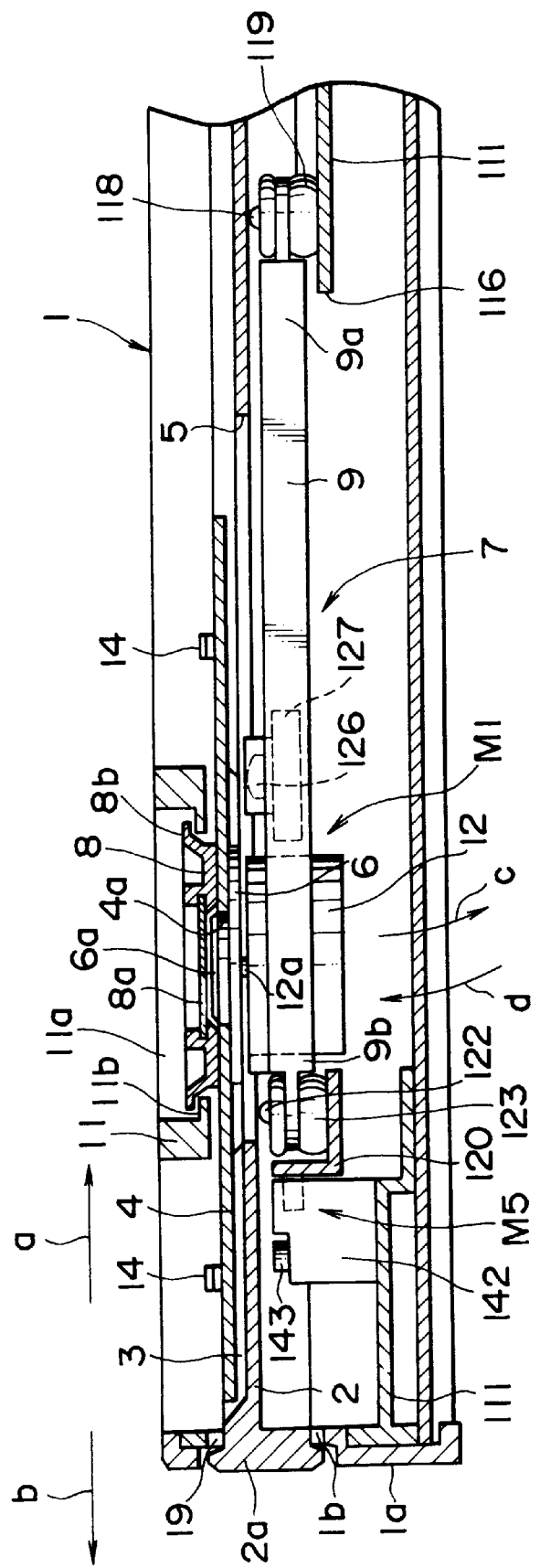
FIG. 26 is a side view in section along the line 35B—35B of FIG. 24 showing the chucking state of the disk chucking mechanism of the disk apparatus according to this invention.

The base unit 9 is therefore free to be rotated, by the lever 120 in the up/down directions c, d about the pair of left and right insulators 119 as pivots, between a descent position shown in FIG. 25 and an ascent position shown in FIG. 26.

The spindle motor 12 is fixed vertically pointing upwards at a position near the end 9*b* in the direction b of the base unit 9, and the disk table 6 is fixed horizontally on the upper end of its spindle 12*a*.

An opening 124 is formed further to the rear than the spindle motor 12 of the base unit 9, a carriage 127 carrying an object lens 126 of an optical pickup 7 being disposed inside this opening 124 such that it is free to move in the directions a, b.

The carriage 127 is guided by a pair of left and right guide shafts 128 attached to the base unit 9, and the carriage 127 is moved in the directions a, b by a linear motor mechanism M2 comprising a pinion 131 driven via a gear train 130 by a motor 129 attached to the base unit 9, and a rack 132 fixed to the carriage 127.

Disk Chucking

First, when the base unit 9 has descended in the direction c to its lower position under its own weight as shown in FIG. 25, the disk 4 is loaded horizontally in the direction a into the body 1 of the apparatus by the tray 2 as described hereintofore so that the disk 4 is inserted between the table 6 and chucking pulley 8.

When loading is complete, the lever 120 is driven in the direction d as described hereinafter, and the base unit 9 is lifted in the direction d to its ascent position so that it is horizontal as shown in FIG. 26.

The table 6 is then inserted from the direction d into the notch 5 of the tray 2, the centering piece 6a of the table 6 engages from the direction d with the center hole 4a of the disk 4, and the table 6 pushes the disk 4 up inside the recess 3 of the tray 2.

The table 6 also lifts the chucking pulley 8 up together with the disk 4, and the metal plate 8a of the pulley 8 is simultaneously pulled down by an annular chucking magnet 6d (FIG. 8) embedded in the upper surface of the centering piece 6a. The pulley 8 then performs magnetic chucking of the outer circumference of the center hole 4a of the disk 4 on the table 6.

Disk Playback

After chucking of the disk 4, the disk 4 is rotated together with the table 6 that is rotated by the spindle motor 12, the carriage 127 of the optical pickup 7 is moved in the directions a, b by the linear motor mechanism M2. and playback of the disk 4 is performed by the object lens 126.

Disk Chucking Release

After playback of the disk 4, the lever 120 is driven in the direction c as described hereinafter, and the base unit 9 falls in the direction c under its own weight as shown in FIG. 25. The centering piece 6a of the table 6 is therefore released from the center hole 4a of the disk 4, and descends in the direction c to a lower position than the tray 2. The disk 4 is thereby again placed on the recess 3 of the tray 2, and the flange 8b of the pulley 8 comes into contact with the top of the flange 11b of the pulley holder 11 so that the pulley 8 is again suspended in a position above the disk 4.

After chucking is released, the disk 4 is ejected in the direction b from the body 1 of the disk apparatus by the tray 2.

Disk Tray Drive Mechanism

Next, a disk tray drive mechanism M3 for loading and ejecting the disk tray 2 will be described with reference to FIG. 15 FIG. 26.

This disk tray drive mechanism M3 comprises a rack 136 shaped effectively liked a letter J and a parallel guide groove 137 formed in a one-piece construction on the underside of the tray 2 that is formed of a synthetic resin or the like, a pinion 138 that drives the rack 136 and guide pin 139 that moves along the guide groove 137, a motor 140 that rotates the pinion 138 forwards or backwards, a gear base 141 rotated by the guide pin 139, and a cam lever 142 that is rotated by this gear base 141 so as to rotate the aforesaid lever 120.

The gear base 141 is formed of a synthetic resin or the like. An effectively cylindrical boss 141a formed in a one-piece construction on the base of this gear base 141 fits over the outer circumference of a vertical pivot shaft 143 formed in a one-piece construction with the chassis 111, the gear base 141 being free to rotate in directions A, B about the pivot shaft 143. The guide pin 139 is formed in a one-piece construction with the gear base 141 so that the pin projects vertically from the tip of the gear base 141, and the pinion 138 fits over the outer circumference of the guide pin 139 so that the pinion is free to rotate.

A belt 146 is wound around a drive pulley 144 fixed on the outer circumference of a motor shaft 140a of the motor 140 that is attached to the chassis 111 such that the motor is pointing upwards, and around a driven pulley 145 attached so that it is free to rotate on the outer circumference of the boss 141a. An intermediate gear 147, consisting of a two-stage gear, fits over the outer circumference of a vertical shaft 141b formed in a one-piece construction with the gear base 145 in its middle region such that the gear is free to rotate. This intermediate gear 147 engages with an input gear 148 formed in a one-piece construction on the underside of the driven pulley 145 and with an output gear 149 formed in a one-piece construction with the underside of the pinion 138, these gears 148, 147 and 149 comprising a reducing gear train. This gear train and the belt 146 together comprise a pinion drive mechanism M4.

The input gear 148 is a sun gear. The pinion 138, output gear 149 and intermediate gear 147 form an epicyclic gear that executes a circular motion along the outer circumference of the input gear 148.

The pinion 138 engages with the rack 136, and the upper end of the guide pin 139 engages free to move in the guide groove 137 as shown in FIG. 15–FIG. 20.

Figure 21:
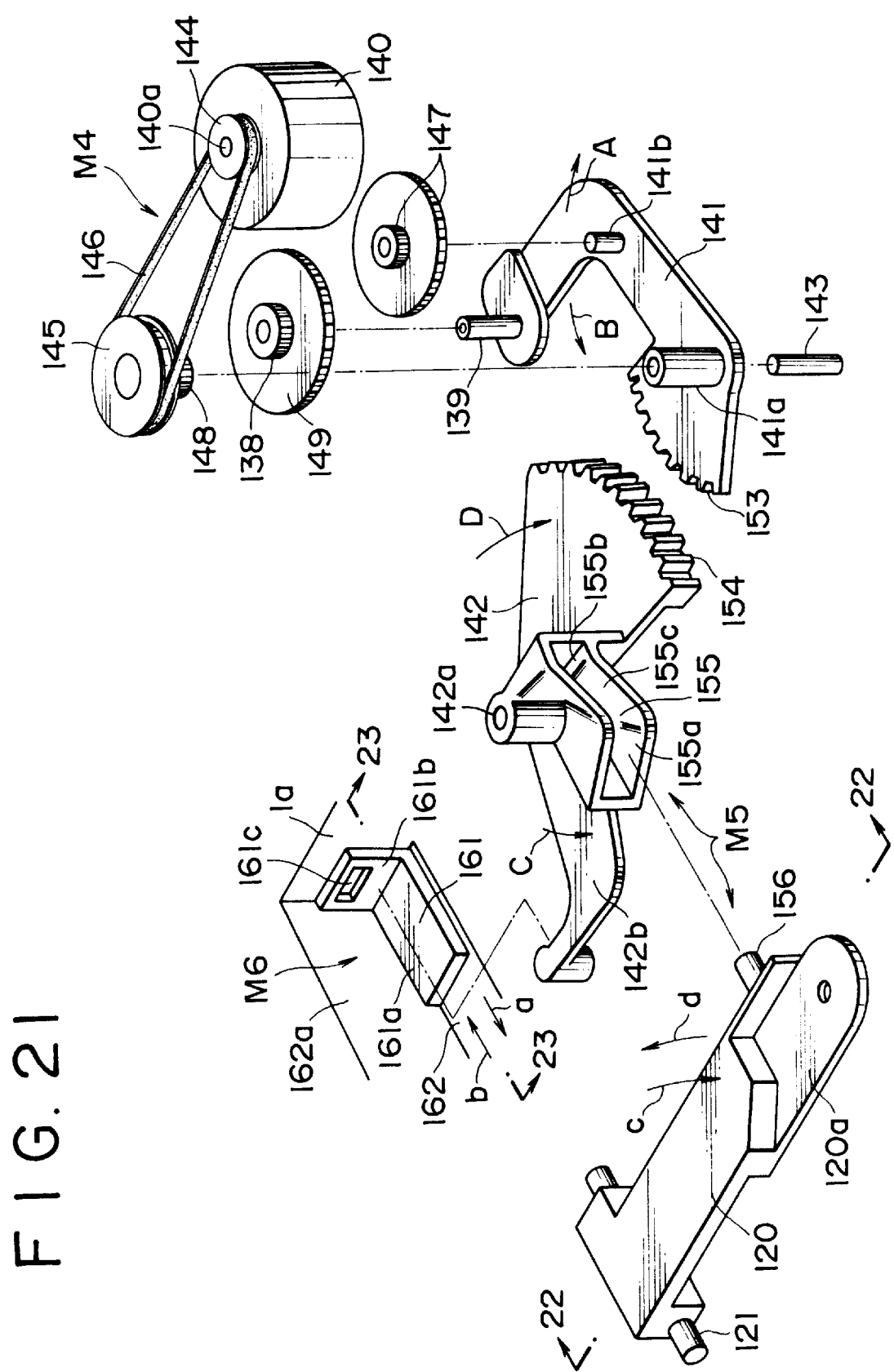
FIG. 21 is a perspective view of components for the purpose of illustrating the disk tray drive mechanism of the disk apparatus according to this invention.

The cam lever 142 is formed of a synthetic resin or the like. As shown in FIG. 21 and FIG. 22, a cylindrical boss 142a, formed in a one-piece construction with the cam lever 142 in its middle region, fits over the outer circumference of a vertical shaft formed in a one-piece construction with the chassis 111, the cam lever 142 being free to rotate in directions C, D about the shaft. A partial gear 153 is formed in a one-piece construction on one edge of the base of the gear base 141, and a partial gear 154 is formed in a one-piece construction on one edge of one end of the cam lever 142. The partial gears 153, 154 engage with each other.

A cam groove 155 shaped effectively like a letter Z, formed in a one-piece construction on one side of the boss 142a of the cam lever 142, and a cam driven pin 156 formed in a one-piece construction on one side of the tip of the lever 120, this pin 156 engaging freely in the cam groove 155, together form a cam drive mechanism M5. The cam groove 155 comprises a low part 155a that is a horizontal step, a high part 155b, and a slanting part 155c that directly joins these two parts. The low part 155a is formed longer in a circular direction centered on the boss 142a.

Figure 19:
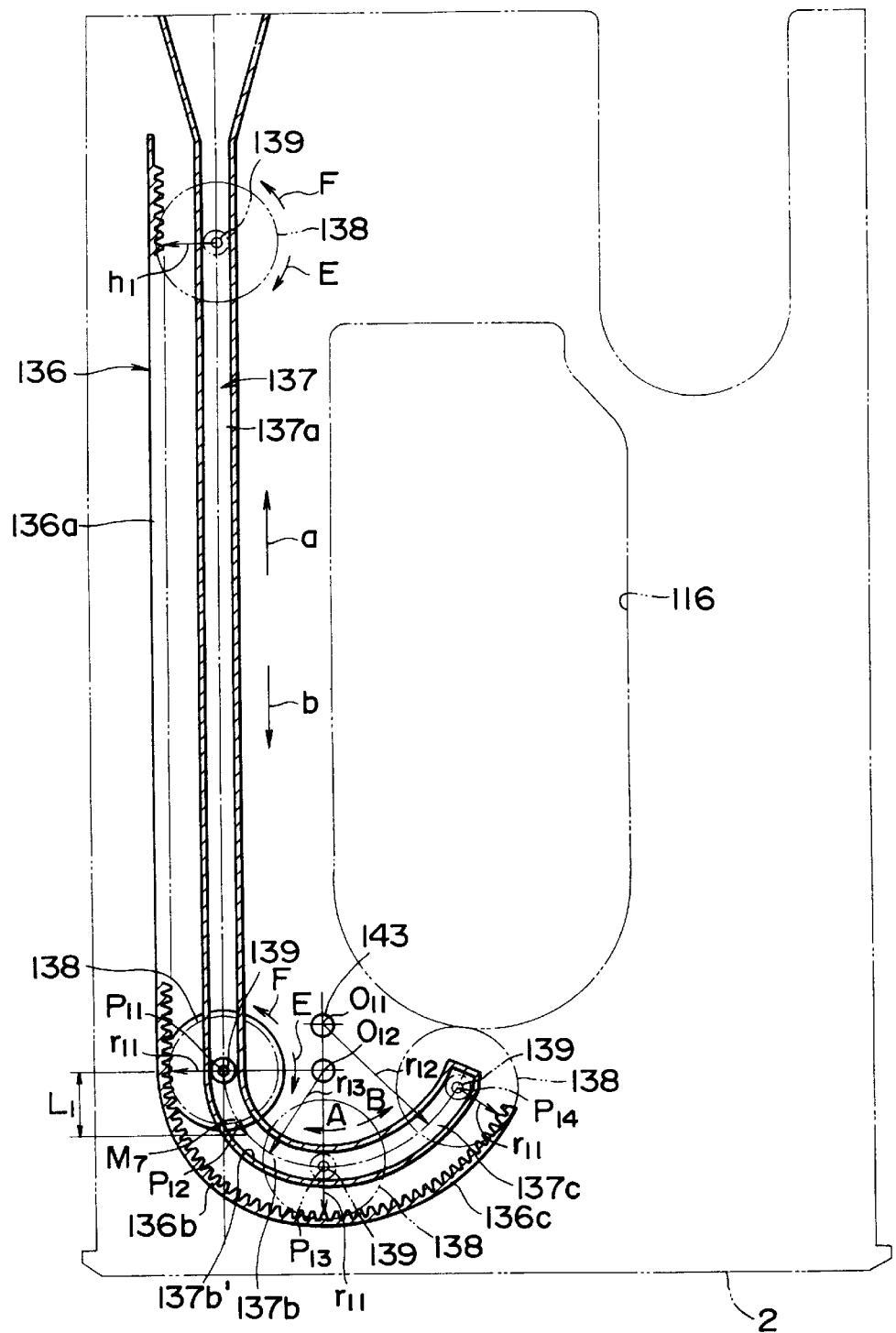
FIG. 19 is a partial cutaway plan view for the purpose of illustrating the relative positional relationship between a rack, guide groove, pinion and guide pin of the aforesaid disk tray.
Figure 20:
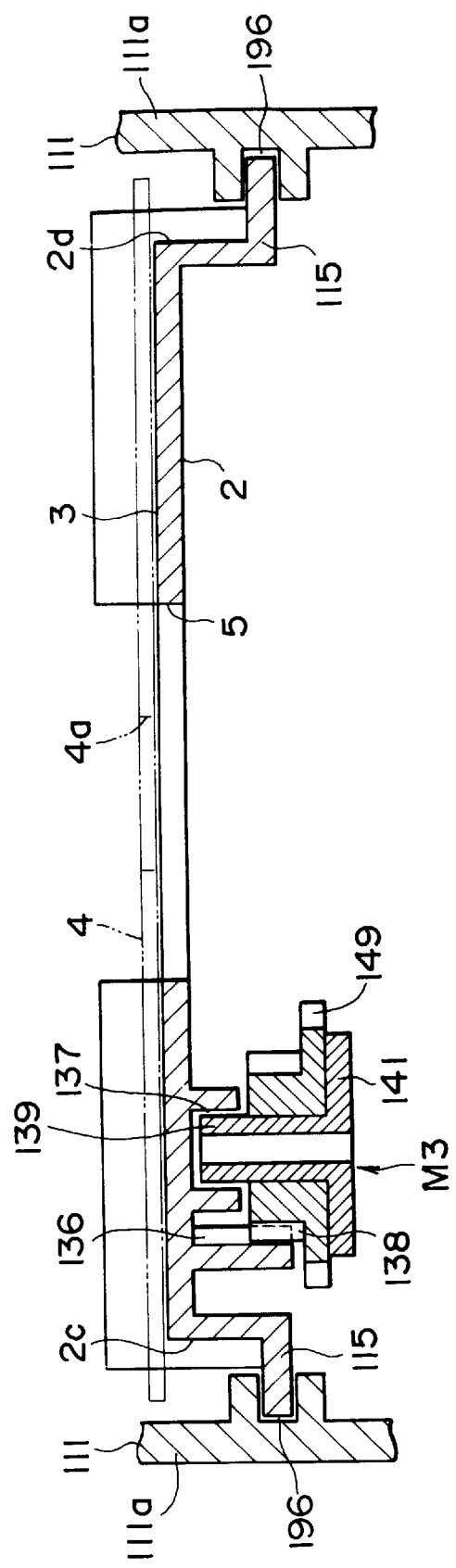
FIG. 20 is an enlarged sectional view along a line 20—20 in FIG. 18.

The rack 136 formed in a one-piece construction with the underside of the tray 2, and the guide groove 137, are formed effectively in the shape of a letter J and are parallel to one another at a distance equal to the radius $r_{11}$ of the pinion 138, as shown in FIG. 19. The rack 136 and groove 137 comprise straight portions 136a, 137a that are parallel to the direction a that is the loading direction of the tray 2, first arc-shaped portions 136b, 137b and second arc-shaped portions 136c, 137c. These arc-shaped portions are smoothly joined in order to the ends in the b direction, that is the ejection direction, of the straight portions 136a, 137a, and are parallel to each other with the guide groove 137 on the inside.

The curvature radius $r_{12}$ of the center of the second arc-shaped portion 137c that is smoothly joined to the first arc-shaped portion 137b of the guide groove 137, is equal to the rotation radius of the center of the guide pin 139 that rotates in the directions A, B around the center $O_{11}$ of the pivot shaft 143. The first arc-shaped portion 137b that is smoothly joined to the straight portion 137a is formed like an arc about a virtual center $O_{12}$, the curvature radius $r_{13}$ of the center of this first arc-shaped portion 137b being smaller than the curvature radius $r_{12}$ of the second arc-shaped portion 137c.

The curvature radius of the first arc-shaped portion 136b of the rack 136 is formed equal to $r_{13}+r_{11}$, and the curvature radius of the second arc-shaped portion 136c is formed equal to $r_{12}+r_{11}$.

Emergency Eject Mechanism

Next, an emergency eject mechanism M6 will be described with reference to FIG. 15–FIG. 23.

First, this emergency eject mechanism M6 comprises an eject cam mechanism M7 comprising the first arc-shaped portion 137b whereof the curvature radius $r_{13}$ of the effectively J-shaped guide groove 137 of the disk tray 2 is small, and the guide pin 139 on the tip of the gear base 141, as shown in FIG. 19.

An emergency eject slider 161 is disposed at the far rear of the emergency eject hole 108 inside the front panel 1a of the body 1 of the disk apparatus, as is shown in particular detail in FIG. 21–FIG. 23.

This emergency eject slider 161 is formed in an effectively L-shape comprising a flat plate 161a and vertical plate 161b made of a synthetic resin, such that the slider can move in a straight line in a guide groove 162 parallel to the directions a, b formed in the chassis 111. A recess 161c is formed in a one-piece construction in the vertical plate 161b on the side of the front panel 1a opposite the emergency eject hole 108.

An arm 142b that extends on the opposite side to the partial gear 154 of the cam lever 142, comes into contact with this vertical plate 161b of the emergency eject slider 161 from the direction b.

The emergency eject means therefore comprises the emergency eject slider 161 and the cam lever 142.

Disk Tray Loading

First, when the disk tray 2 has been completely ejected in the direction b shown in FIG. 1 or FIG. 3, the positions of the pinion 138 and guide pin 139 are fixed by the end positions on the a direction side of the straight portions 136a, 137a of the rack 136 and guide groove 137 of the tray 2, as shown by the double dot-and-dash line of FIG. 19.

Figure 16:
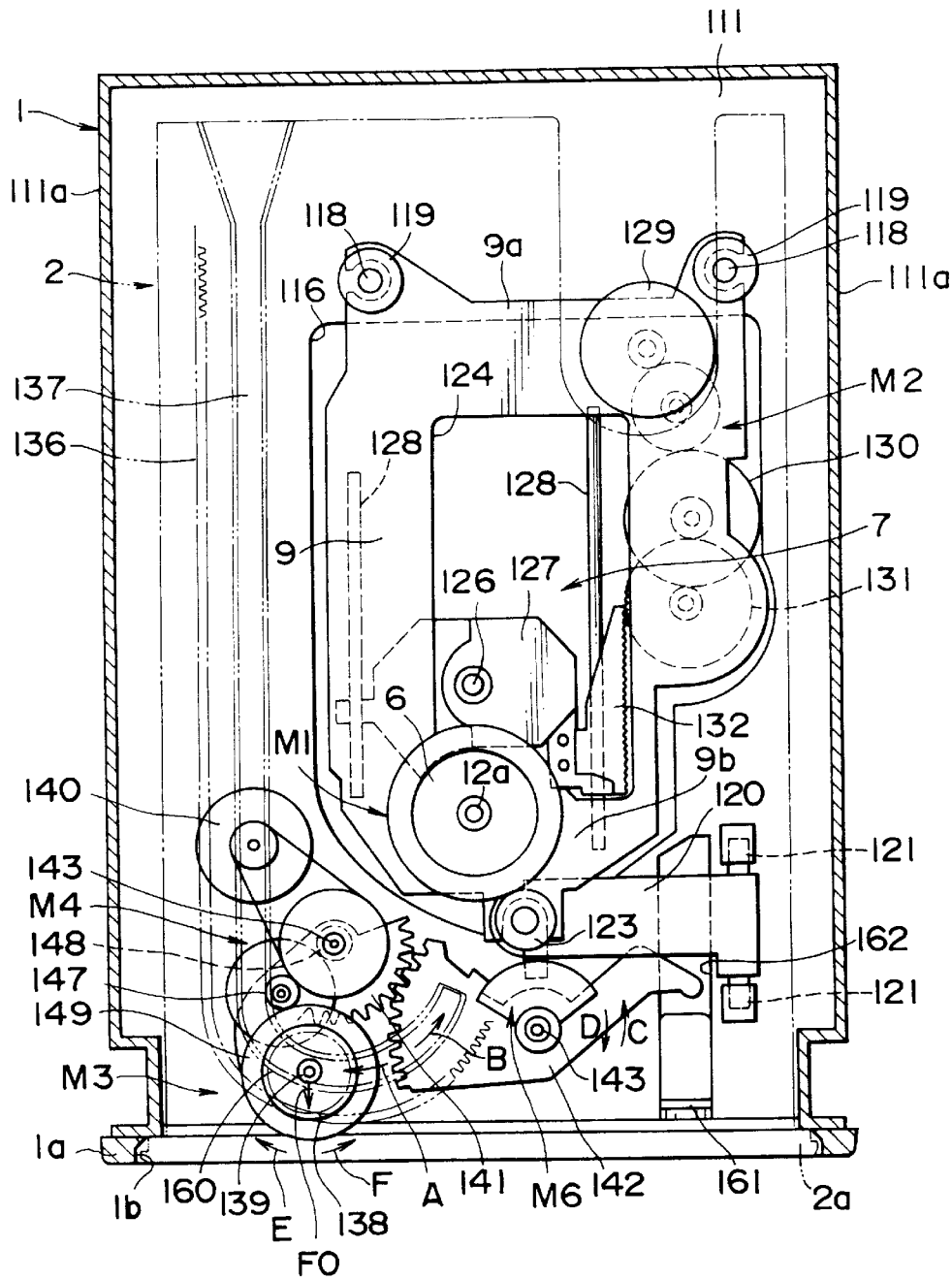
FIG. 16 is a partial cutaway plan view of the whole body of the disk apparatus for the purpose of illustrating the state of the disk tray of the disk apparatus according to this invention when loading is complete.
Figure 18:
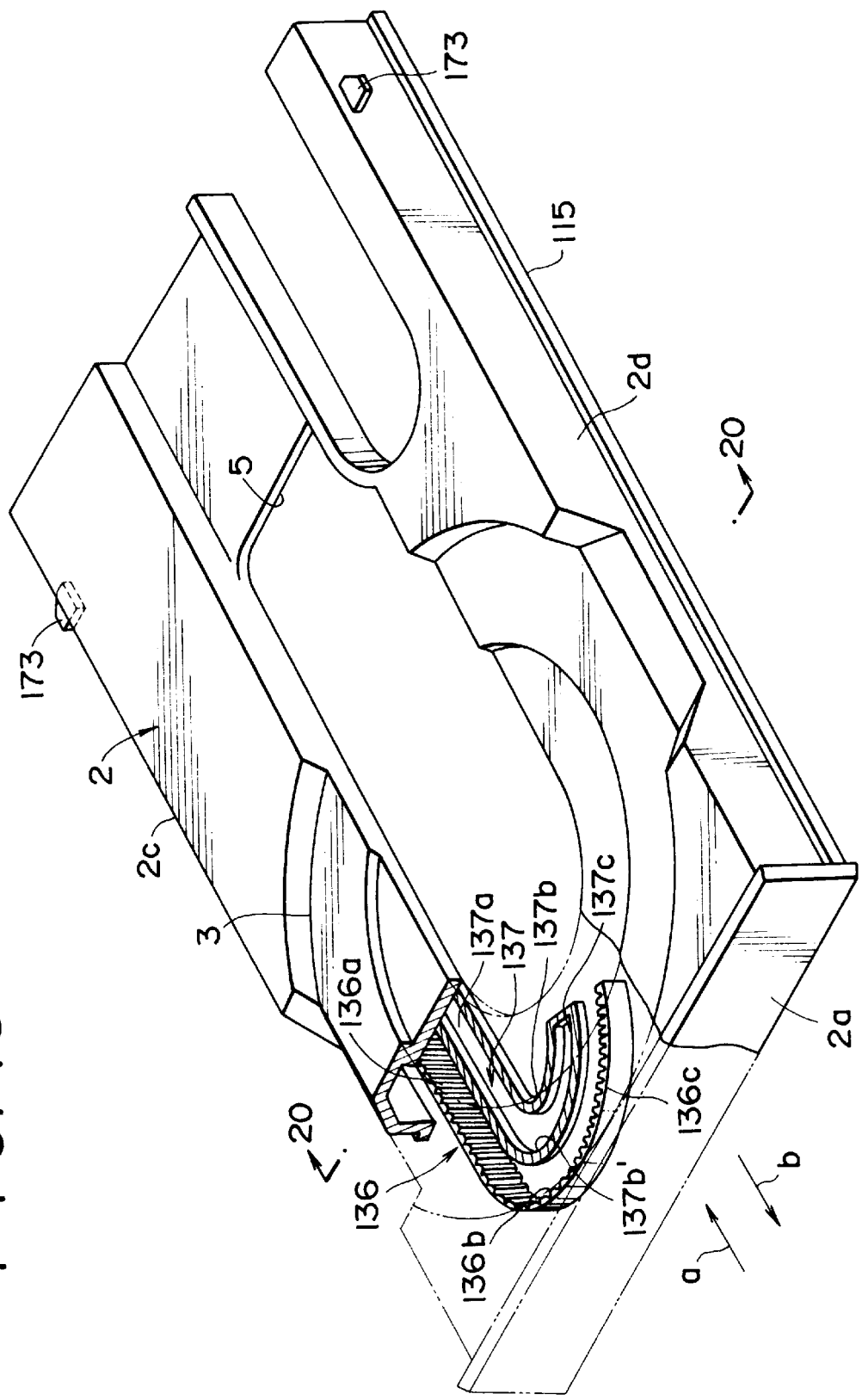
FIG. 18 is a partial cutaway view in perspective of the disk tray of the disk apparatus according to this invention.

Next, when the aforesaid loading switch is switched ON, the motor 140 of the disk tray drive mechanism M3 shown in FIG. 15–FIG. 17, is rotated in a clockwise direction, and the pinion 138 is rotated in a clockwise direction E shown by the double-dot-and-dash line of FIG. 19 via the pinion drive mechanism M4.

The guide pin 139 then engages with the straight portion 137a of the guide groove 137, free rotation in the directions A, B around the pivot shaft 143 of the gear base 141 being restrained by this guide pin 139. The pinion 138 therefore rotates smoothly in the direction E at a fixed position, and the straight portion 136a of the rack 136 is driven smoothly in the direction a.

The tray 2 is thus loaded in the direction a in the body 1 of the disk apparatus together with the rack 136, while the pinion 138 and guide pin 139 move along the straight portion 137a of the guide groove 137 relatively in the direction b.

The loading of the tray 2 in the direction a continues, and finally, the pinion 138 and guide pin 139 reach the intersection $P_{11}$ between the center line of the straight portion 137a and the center line of the first arc-shaped portion 137b of the guide groove 137, as shown by the solid lines in FIG. 15 and FIG. 19.

As the pinion 138 continues to rotate in the clockwise direction E, the pinion 138 moves in the direction B along the first arc-shaped portion 136b of the rack 136, the gear base 141 is rotated in the direction B about the pivot shaft 143 as center $O_{11}$, and the guide pin 139 advances in the direction B along the first arc-shaped portion 137b of the guide groove 137.

As the curvature radius $r_{13}$ of the center of the first arc-shaped portion 137b of the guide groove 137 is formed smaller than the rotation radius of the center of the guide pin 139 around the pivot shaft 143 as center $O_{11}$, the speed of motion of the disk tray 2 in the direction a is reduced.

In other words, the distance $L_1$ in the direction a, b between the intersection $P_{12}$ of the extrapolation in the direction A of the center line of the second arc-shaped portion 137c of the guide groove 137 formed with a curvature radius $r_{12}$, equal to the rotation radius of the guide pin 139 around the pivot shaft 143 as center $O_{11}$, with the extrapolation in the direction b of the center line of the straight portion 137a, and the intersection $P_{11}$ of the center line of the straight portion 137a with the center line of the first arc-shaped portion 137b, is set to for example approx. 10.5 mm, as shown in FIG. 19, so the speed of motion of the tray 2 in the direction a within this distance $L_1$ is thereby reduced.

When the pinion 138 and guide pin 139 reach the intersection $P_{13}$ between the center line of the first arc-shaped portion 137b and the center line of the second arc-shaped portion 137c of the guide groove 137, as shown by the dot-and-dash lines in FIG. 16 and FIG. 19, the tray 2 is completely inserted in the direction a in the body 1 of the disk apparatus, and loading of the tray 2 is complete.

As the pinion 138 continues to rotate in the clockwise direction E, the pinion 138 moves in the direction B along the second arc-shaped portion 136c of the rack 136. The distance moved by the pinion 138 in the direction B in the second arc-shaped portion 136c is an overstroke step. Due to this overstroke of the pinion 138 in the direction B, the gear base 1 41 continues to rotate in the direction B about the pivot shaft 143 as center $O_{11}$, and the guide pin 139 advances in the direction B in the second arc-shaped portion 137c of the guide groove 137.

As the curvature radius $r_{12}$ of the center of the second arc-shaped portion 137c of the guide groove 137 is formed smaller than the rotation radius of the center of the guide pin 139 about the pivot shaft 143 as center $O_{11}$, the guide pin 139 moves smoothly in the direction B in the second arc-shaped portion 137c, and the tray 2 is then held in the loading complete position.

The fact that the pinion 138 and guide pin 139 have reached the end point $P_{14}$ of the second arc-shaped portion 137c of the guide groove, as shown by the dot-and-dash line in FIG. 19, is detected by a detecting switch, not shown, from the rotation angle of the gear base 141, for example, and the eject motor 140 stops.

As the pinion 138 advances in the direction B from the point $P_{11}$ via the point $P_{12}$ to the point $P_{14}$, as shown in FIG. 15–FIG. 19, the gear base 141 is rotated in the direction B from the position shown in FIG. 15 to the position shown in FIG. 17 about the pivot shaft 143 as center, and the cam lever 142 is rotated via the partial gears 153, 154 in the direction D from the position shown in FIG. 15 to the position shown in FIG. 17. The cam groove 155 of the cam lever 142 then moves in the direction D relative to the cam driven pin 156.

Figure 22A:
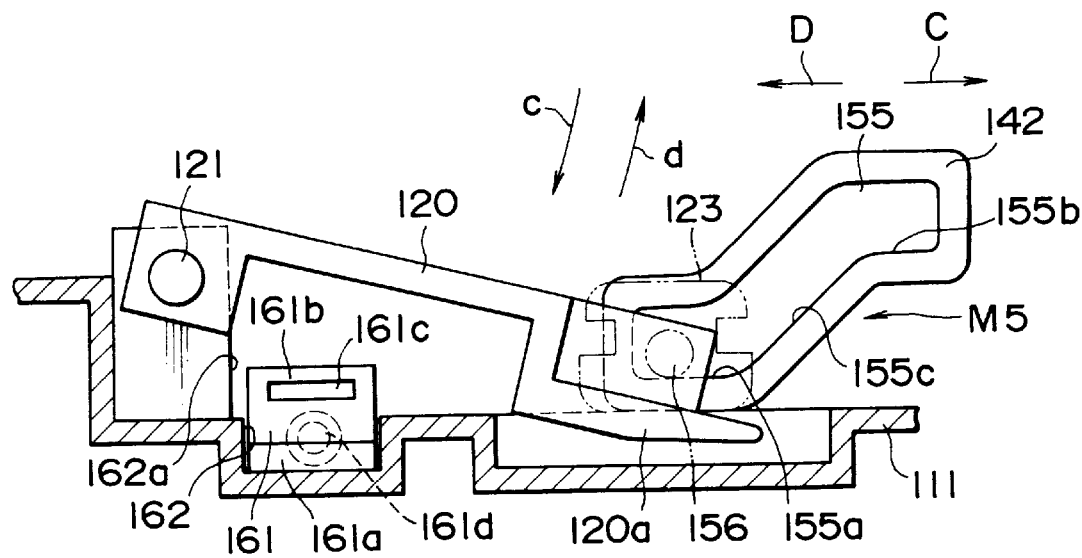
FIGS. 22A and 22B are side views in section along a line 22—22 of FIG. 21 for the purpose of illustrating a rotation drive of a base unit drive lever of the disk apparatus according to this invention.

As the pinion 138 is moving in a direction f from the point $P_{11}$ to the point $P_{13}$, the cam driven pin 156 of the base unit drive lever 120 moves relatively in the direction C in the low part 155A of the cam groove 155 of the cam lever 142, as shown in FIG. 22A.

Figure 22B:
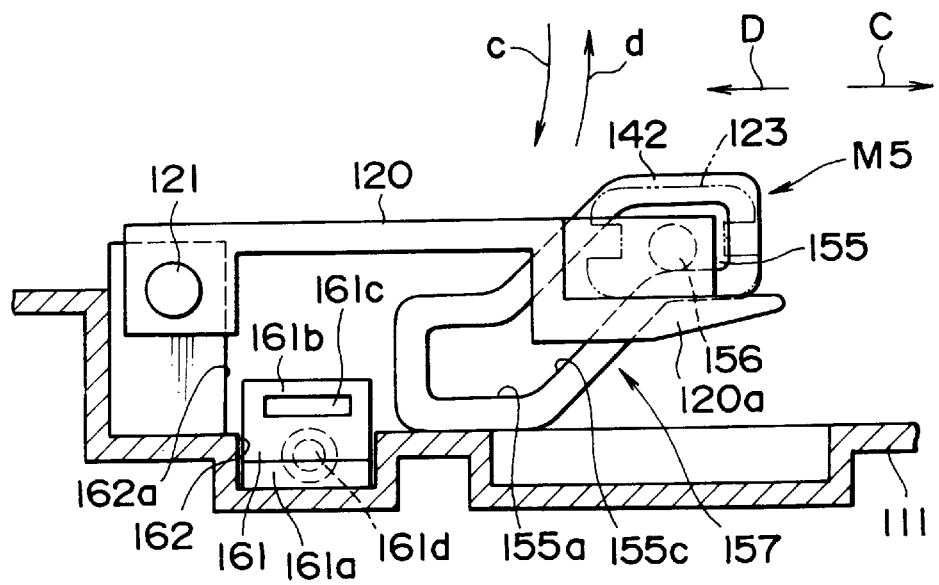

As the pinion 138 is performing overstroke in the direction B from the point $P_{13}$ to the end point, $P_{14}$, the cam driven pin 156 is lifted in a direction d via the slanting part 155c to the high part 155b of the cam groove 155, and the lever 120 is rotated in the direction d, as shown in FIG. 22B.

Due to the overshoot in the direction B of the pinion 138 after loading of the tray 2 in the direction a is complete. the base unit 9 is rotated in the direction d from the descent position shown in FIG. 25 to the ascent position shown in FIG. 26 by the lever 120. chucking of the disk 4 by the aforesaid disk chucking mechanism M1 is performed, and the disk 4 is pushed up above the recess 3 of the tray 2 by magnetic chucking onto the disk table 6.

Disk Tray Ejection

Next, when the aforesaid eject switch is switched ON, or when an eject signal is issued by the host computer, the motor 140 of the loading and disk tray drive mechanism M3 is rotated in the reverse direction, and the tray 2 is ejected in the direction b in the body 1 of the disk apparatus by the reverse sequence of actions to loading. In other words, when the pinion 138 is rotated in the reverse direction F by the motor 140 at the end point $P_{14}$ of the second arc-shaped portion 137c of the guide groove 137 shown by the dot-and-dash lines in FIG. 17 and FIG. 19, the pinion 138 returns from overstroke in the direction e from the end point $P_{14}$ to the point $P_{13}$ shown by the dotted lines in FIG. 16 and FIG. 19 along the second arc-shaped portion 136c of the rack 136, and the gear base 141 is rotated in the direction A from the position shown in FIG. 17 to the position shown in FIG. 16.

The cam lever 142 is then rotated via the partial gears 153, 154 in the direction C from the position shown in FIG. 17 to the position shown in FIG. 16, the cam driven pin 156 falls under its own weight from the high part 155b via the slanting part 155c to the low part 155a of the cam groove 155, and the lever 120 is rotated in the direction c under its own weight, as shown in FIG. 22A.

The base unit 9 is rotated together with the lever 120 from the ascent position shown in FIG. 26 to the descent position shown in FIG. 25, the chucking of the disk 4 by the aforesaid disk chucking mechanism M1 is released, and the disk 4 is again mounted in the recess 3 of the tray 2.

The pinion 138 continues to be rotated in the reverse direction F, and the pinion 138 and guide pin 139 advance in the direction e from the intersection point $P_{13}$ shown by the dotted lines in FIG. 16 and FIG. 19 along the first arc-shaped portions 136b, 137b of the rack 136 and guide groove 137, to the intersection point $P_{11}$ shown by the solid lines in FIG. 15 and FIG. 19.

Due to the cam action of the eject cam mechanism M7, comprising the first arc-shaped portion 137b of the guide groove 137 and the guide pin 139 of the emergency eject mechanism M6, i.e. due to a force component FO in the direction a shown in FIG. 16 that is produced when the guide pin 139 presses an arc surface 137b' of the first arc-shaped portion 137b of the guide groove 137, the tray 2 is pushed out from the body 1 of the disk apparatus by a distance $L_1$.

Further, the cam driven pin 156 is moved relatively in the direction D in the low part 155a of the can groove 155, as shown in FIG. 22A.

As the pinion 138 continues to rotate clockwise in the direction F, the guide pin 139 drives the straight part 136a of the rack 136 in the direction b. The tray 2 is therefore ejected in the direction b from the body 1 of the disk apparatus, and the pinion 138 and guide pin 139 move along the straight portion 137b of the guide groove 137 relatively in the direction a to the position shown by the double dot-and-dash line in FIG. 19.

Figure 24:
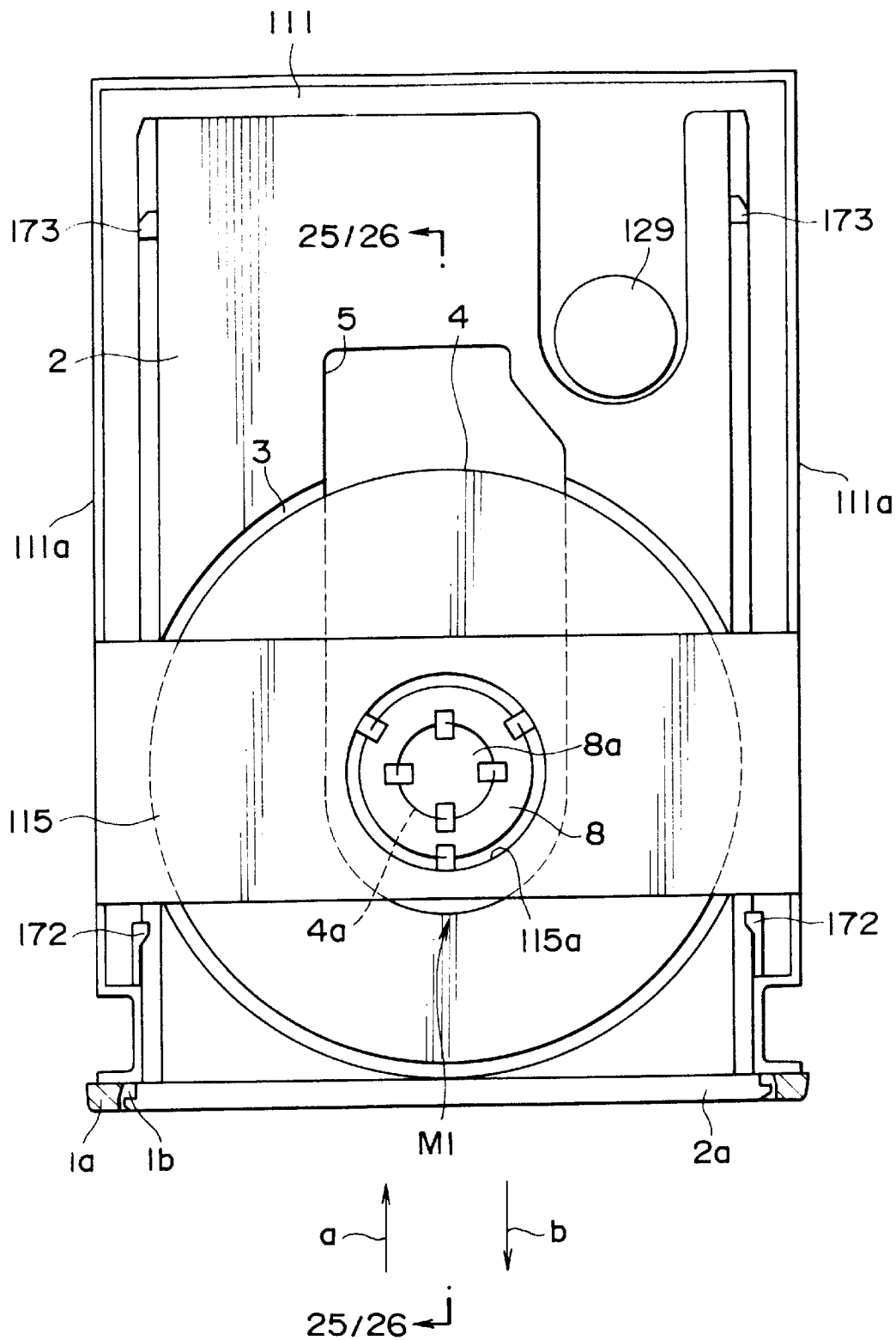
FIG. 24 is a plan view of the body of the disk apparatus according to this invention when the upper cover of the disk apparatus has been removed.

A pair of left and right projections 173 formed in a one-piece construction on the end in the direction a of the left and right lateral surfaces of the tray 2, then come into contact with a pair of left and right stoppers 172 formed in a one-piece construction with the end in the b direction of the left and right side walls 111a of the chassis 111, as shown in FIG. 24, thereby completing the ejection of the tray 2. This completion of ejection of the tray 2 is detected by an eject completion switch, not shown, and the motor 140 stops.

Emergency Eject

When the disk is in the loaded state shown in FIG. 29 or FIG. 30, an emergency eject member 109 is inserted from the direction a, from the emergency eject hole 108. The tip of the member 109 is then pushed against the recess 161c of the emergency eject slider 161, and the slider 161 is pushed out in the direction a by a distance $L_2$ from the position shown by the dot-and-dash line to the position shown by the solid line in FIG. 23.

The vertical plate 161b of this slider 161 then pushes the arm 142b of the cam lever 142 in the direction a by the same distance $L_2$, the cam lever 142 is rotated in the direction C from the position shown in FIG. 17 to the position shown in FIG. 15, and the gear base 141 is rotated via the partial gears 153, 154 from the position shown in FIG. 17 to the position shown in FIG. 15.

Due to the rotation in the direction C of the cam lever 142 from the position shown in FIG. 17 to the position shown in FIG. 15, the base unit 9 is caused to descend in the direction c under its own weight together with the lever 120 from the ascent position shown in FIG. 26 to the descent position shown in FIG. 25, and chucking release of the disk table 6 from the disk 4 is performed as in the case of the aforesaid eject operation of the tray 2

After the chucking of the disk 4 is released, the guide pin 139 of the gear base 141 driven in the direction A pushes the arc surface 137b' of the first arc-shaped portion 137 of the guide groove 137 in the direction A, as shown in FIG. 19. Due to the force component FO in the direction a shown in FIG. 16 produced by this cam action, the tray 2 is gently pushed out by a distance $L_1$ in the direction b from the body 1 of the disk apparatus, as shown by the dot-and-dash line in FIG. 15.

The tray 2 may therefore be easily pushed out in the direction b by a distance $L_1$ from the body 1 of the disk apparatus simply by gently pushing the slider 161 in the direction a using the member 109.

Subsequently, the tray 2 may be completely withdrawn in the direction b from the body 1 of the disk apparatus as shown in FIG. 1 or FIG. 3 by grasping the front panel 1a of the tray 2, and the disk 4 removed. This completes the emergency eject operation.

Base Unit Damping Device

Next, a damping device that permits the base unit 9 to float elastically in the chassis 111 will be described with reference to FIG. 33–FIG. 35.

This damping device is attached to the base unit 9 that is formed of synthetic resin comprising the disk table 6 fixed to the spindle 12a of the spindle motor 12, and an optical pickup 7 provided with a carriage 127 carrying an object lens 36, and a linear motor for driving the carriage. The damping device is elastically supported above the chassis 111 and lever 20 by three fixing screws 91 with flanges 91a and steps 91b, using effectively cylindrical insulators 90 formed of rubber or the like at two points to the left and right of one edge 9a of the base unit 9, and one point effectively in the middle of the other edge 9b.

The three fixing screws 91 are inserted in hollows 90a of the three insulators 90 from above, and screwed vertically into cylindrical bosses 92 formed in a one-piece construction with the chassis 111 and lever 20. Circular holes 90b, 90c in the upper and lower ends of these insulators 90 are coaxially fitted over the outer circumference of the step 91b on the upper surface of each screw 91, and the upper edges of these insulators are pushed down by the flanges 91a of the screws 91. Then, three effectively ¾ arc-shaped horizontal fixing flanges 94 formed in a one-piece construction are fitted horizontally oriented in three directions at three points on the outer circumference of the base unit 9 in a recess 93 formed in the middle, in an axial direction, of the outer circumference of the three insulators 90, so as to support the three points on the outer circumference of the base unit 9 elastically.

The other edge 9b of the base unit is driven by the base unit drive lever 20 in the directions c, d that are the up/down directions, so that the base unit 9 is raised and lowered in the direction c, d by pivoting on the insulators 90 at the two points on the edge 9a.

According to this damping mechanism, if coordinates are taken where the tracking direction of the object lens 126 of the optical pickup 7 is X, the focusing direction is Z, and the direction at right angles to both the X and Z directions is Y (tangential direction with respect to the track recorded on the disk 4), when the disk apparatus is used horizontally and the body 1 is installed horizontally, external vibrations acting on the base unit 9 in the X, Y, Z directions are effectively damped by the three insulators 90, as shown in FIG. 29, 31, 32.

Figure 35A:
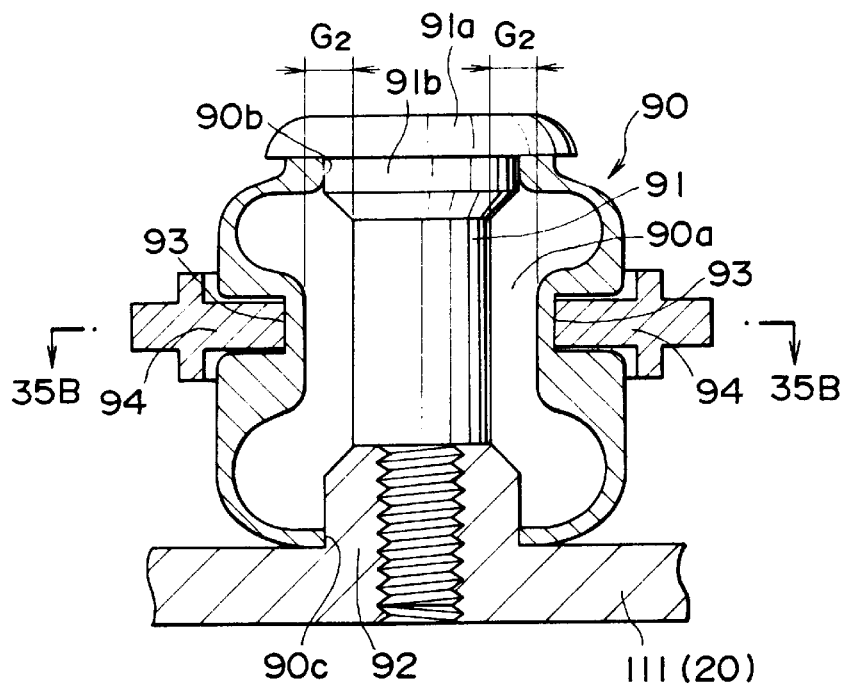
FIG. 35A is a side view in section illustrating an insulator of FIG. 33.
Figure 35B:
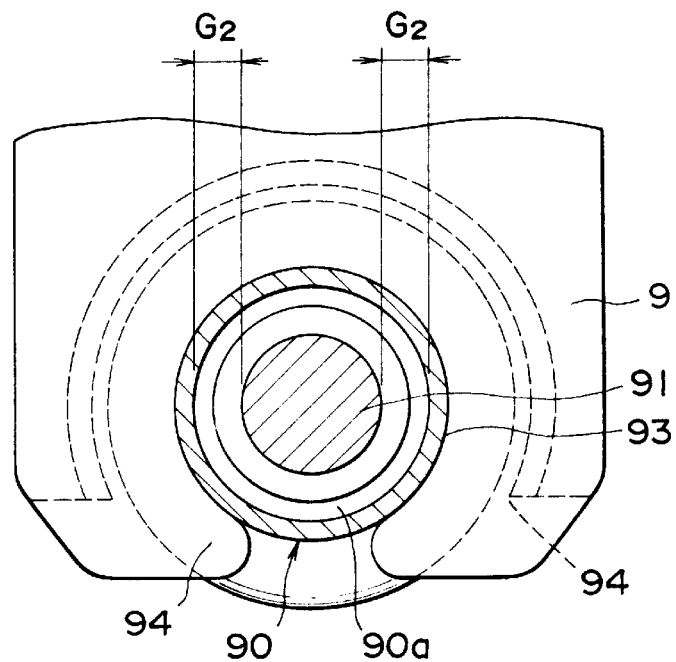
FIG. 35B is a plan view in section along a line M—M of FIG. 35A.
Figure 36A:
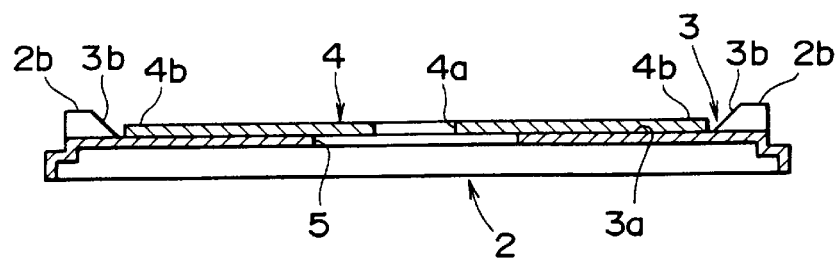
FIG. 36A is a side view in section of a conventional disk apparatus when the apparatus is used horizontally.
Figure 36B:
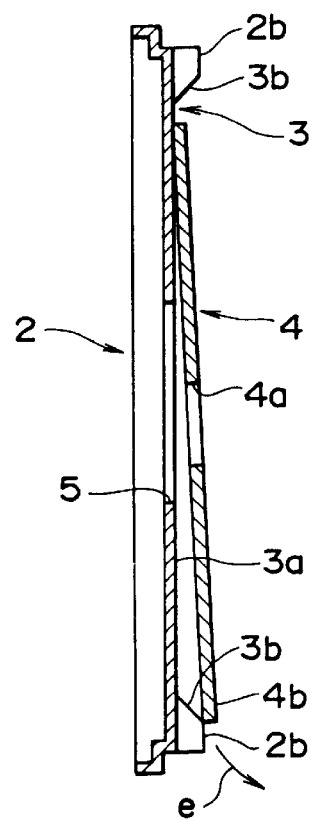
FIG. 36B is a side view in section of a conventional disk apparatus when the apparatus is used vertically.

As shown in the examples of FIGS. 33–35, a clearance $G_2$ of approx. 1.2 mm with respect to the lateral face of the screw 91 is formed inside the insulator 90 giving a large play in the X, Y, Z directions so as to provide sufficient damping in these directions. When the disk apparatus is used vertically with the body 1 vertical, as shown in FIG. 30, therefore, operation of the apparatus is adversely affected due to this large clearance $G_2$.

In other words, when the body is placed vertical, the base unit 9 is also vertical. The base unit 9 is then displaced easily in the Y and Z directions under its own weight with respect to the three screws 91 so that the disk 4, that has been chucked on the disk table 6 and is rotating, may unexpectedly come into contact with the tray 2. Focusing errors of the lens 126 on the disk 4 may also occur.

If the rigidity of the insulators 90 in the X, Y, Z directions is merely increased, the displacement of the base unit 9 becomes smaller, however the damping of external vibrations (shock resistance) is then impaired.

Next, a damping device M8 that resolves the aforesaid problems will be described.

First, the optical pickup 7 in this type of device has the characteristic that it is very weak with respect to external vibrations in the X direction, extremely strong with respect to external vibrations in the Y direction, and fairly strong with respect to vibrations in the Z direction. X, Y, Z refer to the X axis (focusing direction), Y axis (tangential direction to track recorded on the disk) and Z axis shown in FIG. 8.

In this damping device M8 for the base unit 9, three insulators 119, 123 are provided so that the base unit 9 is stabilized, giving adequate damping (shock resistance) in the x direction, and minimal displacement in the Y and Z directions. As shown in FIG. 30, excessive displacement in the Y and Z directions when the body 1 is installed vertically is thereby prevented, and problems of contact of the disk 4 with the table 6, and of focusing errors of the object lens 126, are resolved. Further, even in the horizontal position shown in FIG. 29, the play (leeway) in the Y direction of the base unit 9 is minimized, so that the chucking action of the centering piece 6a of the table 6 on the center hole 4a of the disk 4 loaded in the tray 2 is performed with higher reliability.

Even with regard to damping of external vibrations (shock resistance) of the base unit 9 when the body 1 of the disk apparatus is used horizontally as shown in FIG. 29, the damping effect is equivalent to or greater than that obtained in the case of the insulators shown in FIG. 33–FIG. 35, and a substantially similar effect to the horizontal position is obtained in the vertical position shown in FIG. 30.

Figure 8:
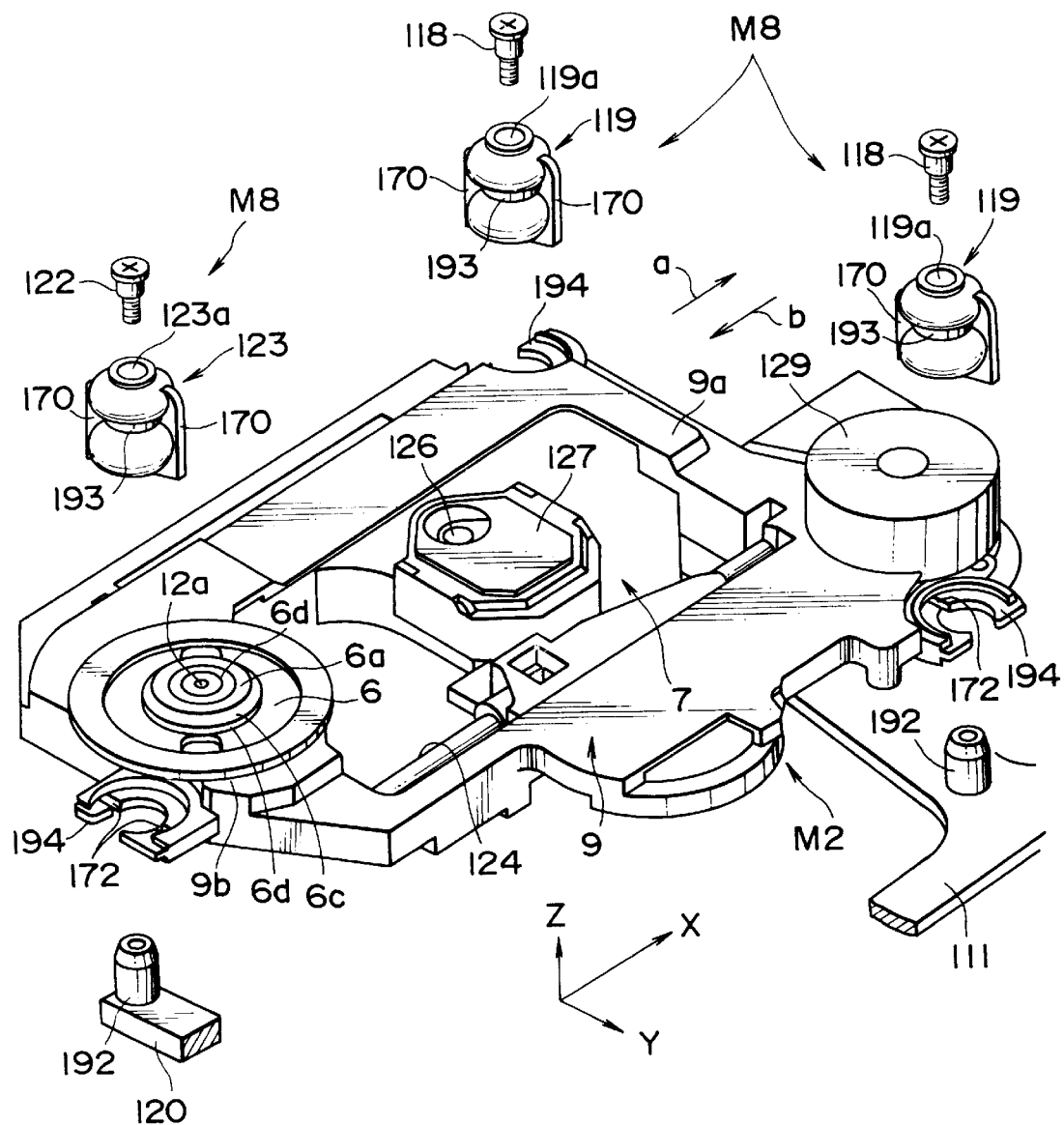
FIG. 8 is a perspective view of components showing a damping device of a base unit in a disk apparatus according to this invention.
Figure 9:
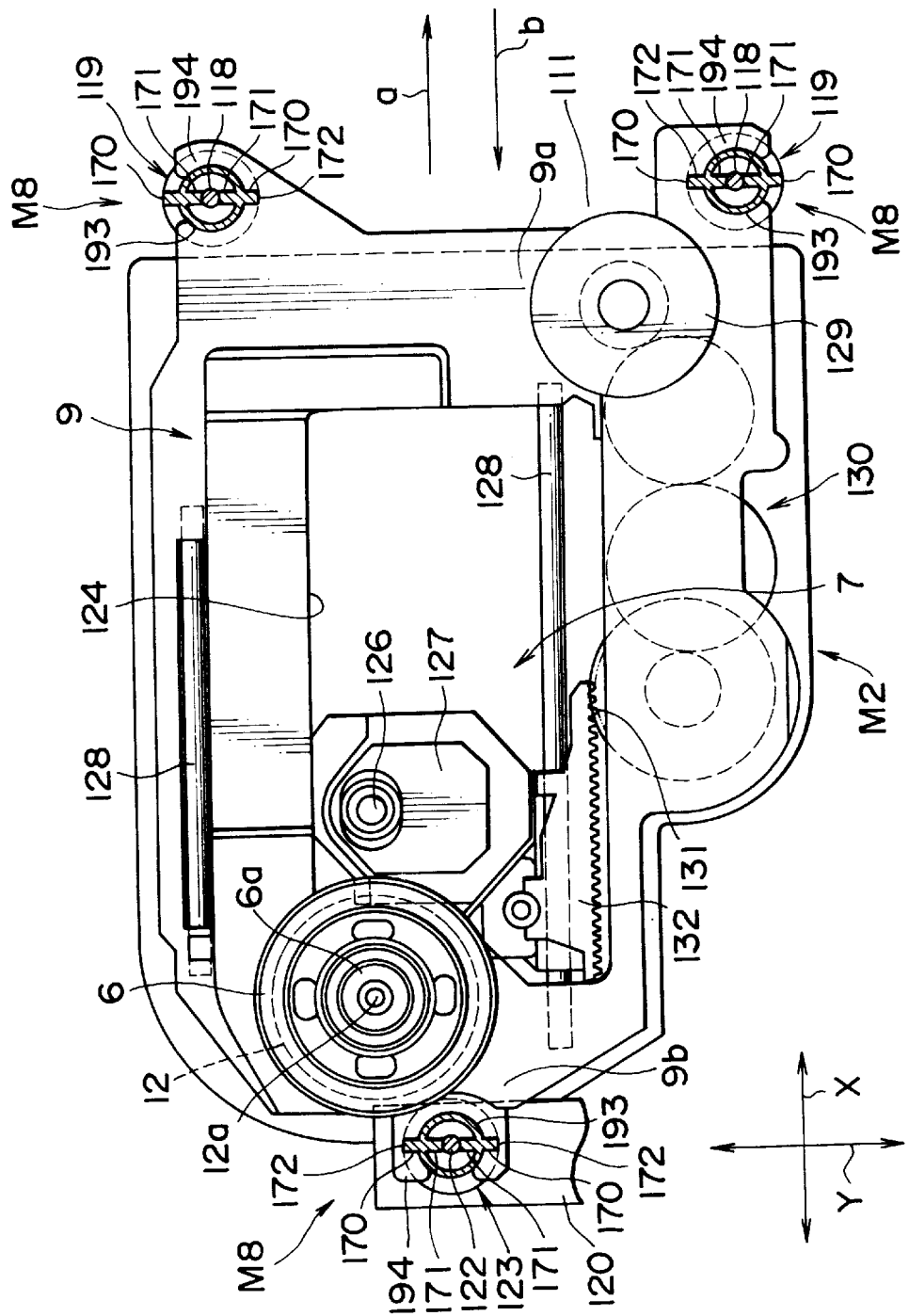
FIG. 9 is a partial cutaway plan view of FIG. 8.

In other words, in this damping device M8, the edge 9a in the direction a of the base unit 9 is elastically supported on the chassis 111 via the two insulators 119, and the middle part of the edge 9b in the direction b of the base unit 9 is elastically supported on the lever 120 by the insulator 123, as shown in FIG. 8 and FIG. 9.

Figure 10:
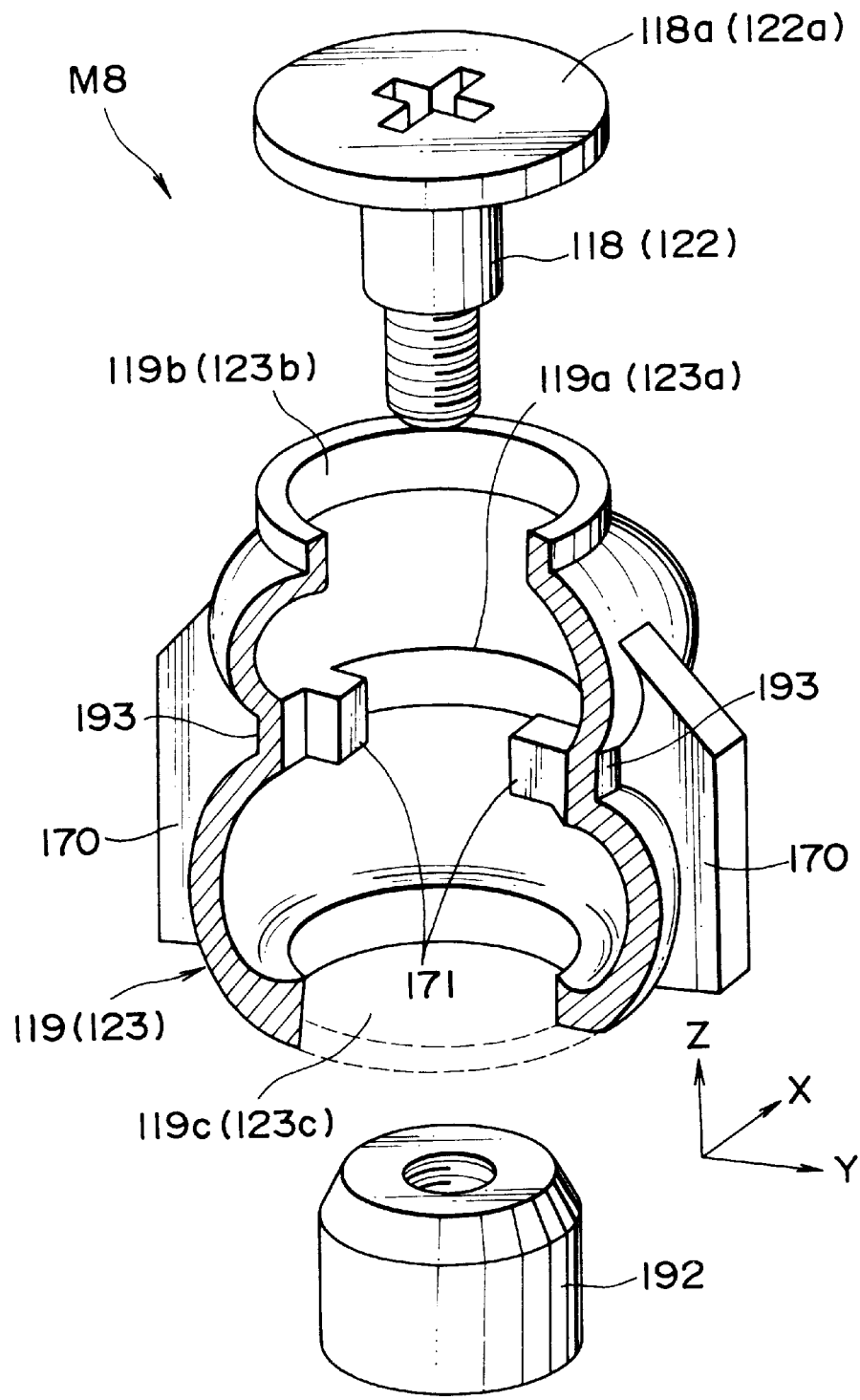
FIG. 10 is a partial cutaway perspective view of an insulator in a damping device of the base unit.
Figure 11A:
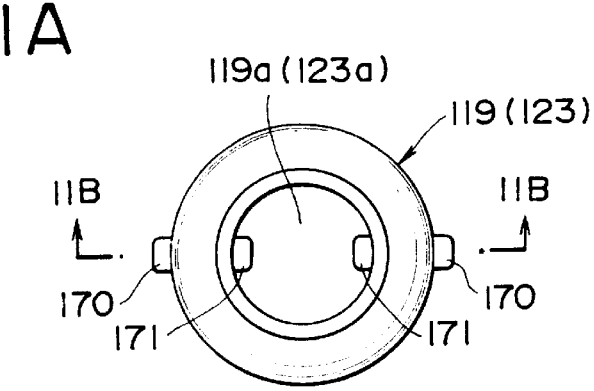
FIG. 11A is a plan view of the aforesaid insulator.
Figure 11B:
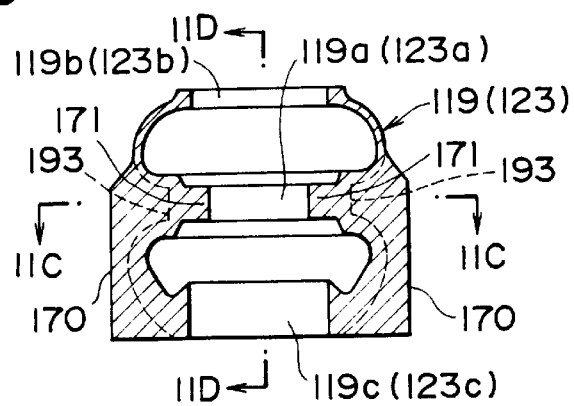
FIG. 11B is a side view in section along a line 11B—11B of FIG. 11A.
Figure 11C:
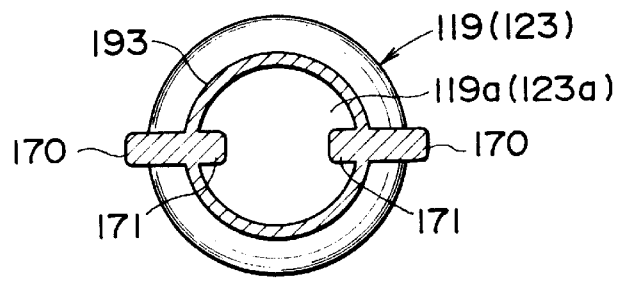
FIG. 11C is a plan view in section along a line 11C—11C in FIG. 11B.
Figure 11D:
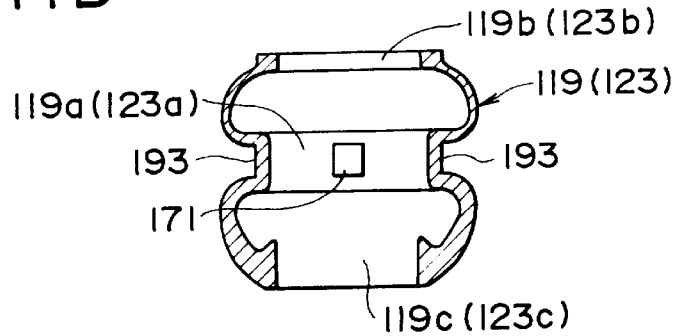
FIG. 11D is a side view in section along a line 11D—11D in FIG. 11B.

The three insulators 119, 123, which are formed of rubber or the like in an effectively cylindrical shape, are attached vertically and coaxially with fixing screws 118, 122 having flanges 118a, 122a and steps 118b, 122b that screw vertically into bosses 192 on the chassis 111 and lever 120, these screws 118, 122 being inserted from above into hollows 119a, 123a in the insulators 119, 123 as shown in FIG. 10, FIG. 12 and FIG. 13. Fixing flanges 194 effectively shaped like ¾ arcs of the outer circumference of the base unit 9 are fitted horizontally in recess grooves 193 in the outer circumference of these insulators 119, 123.

A pair of left and right outer ribs 170 parallel to the Y and Z directions and formed in a one-piece construction, extend from the lower ends of the insulators 119, 123 to an approximately middle position in the axial direction on the outside of the insulators as shown in FIG. 10 and FIG. 11.

Due to this pair of left and right outer ribs 170, deformation or displacement of the insulators 119, 123 in the X direction is fully allowed, while their deformation or displacement in the Z direction is minimized.

A pair of mutually opposite left and right inner ribs 171 is formed in a one-piece construction extending from the Y direction inside the insulators 119, 123, as shown in FIG. 10–FIG. 13.

The clearance $G_1$ between the tips of this pair of left and right inner ribs 171 and the lateral surfaces of the fixing screws 118, 122 is arranged to be only 0.2 mm, as shown in FIG. 12 and FIG. 13. Hence, when the insulators 119, 123 deform or displace in the Y direction, these ribs 171 come into contact with the lateral faces of the screws 118, 122, thereby minimizing the deformation or displacement in the Y direction of the insulators 119, 123.

When the insulators 119, 123 deform or displace in the X direction, the ribs 171 do not come into contact with the lateral faces of the screws 118, 122, hence deformation or displacement of the insulators 119, 123 in the X direction is fully allowed.

A pair of left and right rib grooves 172 is formed in the Y direction on the outer circumference of each of the three fixing flanges 194 of the base unit 9, as shown in FIG. 8, FIG. 9, FIG. 12 and FIG. 13.

When the three insulators 119, 123 are engaged with the three fixing flanges 194 of the base unit 9 by means of the recess grooves 193, the ribs 170 engage with the grooves 172. The positions in the Y direction of the three insulators 119, 123 can therefore be simply and accurately adjusted with respect to the base unit 9.

Next, of the three insulators 119, 123, the insulator 123 that supports effectively the middle part of the edge 9b of the base unit 9, supports a position near the heavy spindle motor 12 to which the disk table 6 is attached, as shown in FIG. 8 and FIG. 9. The hardness of the rubber or other material whereof this insulator 123 is formed, is therefore arranged to be greater than the hardness of the rubber or other material of the other two insulators 119. The deformation or displacement in the X, Y, Z directions of the single insulator 123 supporting a point near the spindle motor 12, is therefore of the same order as the deformation or displacement of the two insulators 119 in the X, Y, Z directions, as shown in FIG. 12 and FIG. 13.

Therefore, although the weight of the spindle motor 12 acts mainly on the other edge 9b of the base unit 9, this other edge 9b is firmly supported elastically by the insulator 123, and the three points on the outer circumference of the base unit 9 are supported elastically in a stable, well-balanced fashion by the three insulators 119, 123.

According to the damping device M8 of the base unit 9 as described hereintofore, deformation or displacement of the insulators 119, 123 in the X direction is fully allowed, whereas their deformation or displacement in the Y and Z directions is minimized. The base unit 9 is therefore fully damped (shock resistance) in the X direction, whereas the amount of its displacement and play (leeway) in the Y and Z directions is minimized by the pair of left and right outer ribs 170 and inner ribs 171.

Next, some modifications of the insulators 119, 123 will be described with reference to FIGS. 14A, 14B, and 14C.

FIG. 14A shows the case where the ribs 170 are formed over the whole length of the insulators 119, 123. FIG. 14B shows the case where the ribs 170 are formed effectively in the middle, in the axial direction, of the insulators 119, 123. FIG. 14C shows the case where the ribs 171 are formed over the whole length of the insulators 119, 123.

Disk Table Centering Piece

Next, the disk table 6 will be described with reference to FIG. 27 and FIG. 28.

The effectively conical centering piece 6a is fitted coaxially on the upper surface of the disk table 6, the outer circumferential surface of this centering piece 6a having a taper surface comprising two stages, viz. a large taper surface 6b at the tip having a taper angle of for example, 45°, and a small taper surface 6c at the base having a taper angle of for example 85°.

Figure 27:
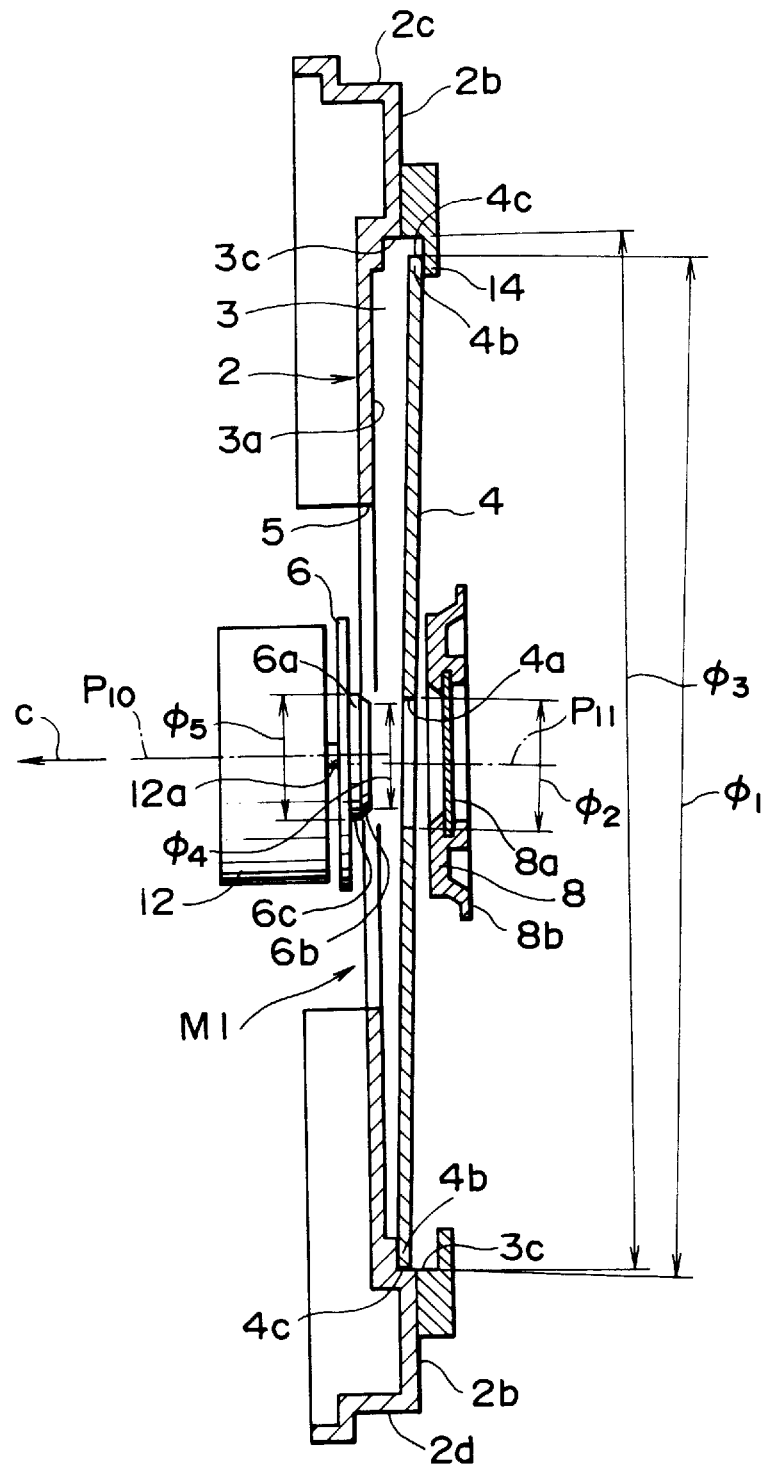
FIG. 27 is a side view in section showing the state prior to disk chucking for the purpose of illustrating the dimensional relationship of a recess in the disk tray and a centering piece of a disk table with respect to the disk of the disk apparatus according to this invention.

When the disk apparatus is used vertically, the disk 4 is loaded in the body 1 of the apparatus such that it is held vertically in the recess 3 of the disk tray 2, as shown in FIG. 27.

The disk 4 then stands on the lower edge of the effectively arc-shaped outer circumference 3c inside the recess 3, and is loaded unevenly, for example leaning on an upper pawl 14.

Figure 28:
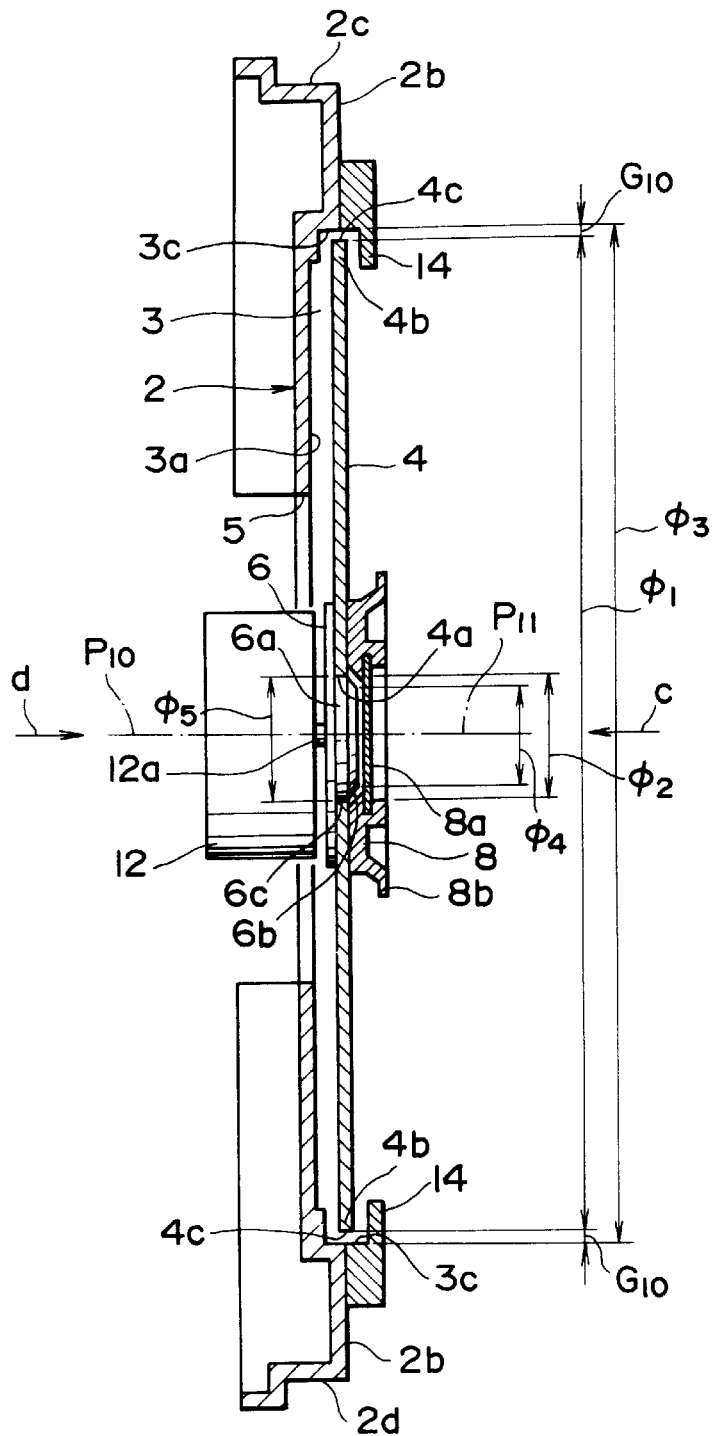
FIG. 28 is a side view in section showing the state after disk chucking is complete for the purpose of illustrating the dimensional relationship of the recess in the disk tray and the centering piece of the disk table with respect to the disk of the disk apparatus according to this invention.

When loading of the disk 4 in the body 1 is complete, the table 6 moves together with the spindle motor 12 in the direction d as shown in FIG. 28. The centering piece 6a then engages with the center hole 4a of the disk 4, the disk 4 floats up on the table 6 in the direction d from the base 3a of the recess 3, and the disk 4 is magnetically chucked vertically from the direction c onto the table 6 by the chucking pulley 8, as described hereintofore.

During the disk chucking operation, the center hole 4a of the disk 4 slides relatively in the direction c on the taper surface 6b at the tip of the centering piece 6a, and when chucking is complete, the center hole 4a of the disk 4 is pushed further in the direction c right to the end of the taper surface 6c at the base of the centering piece 6 so that there is no play of the disk 4 on the centering piece 6a.

Dimensioning of Disk Tray and Disk Table Relative to Disk

Dimensioning of the recess 3 of the tray 2 and the centering piece 6a of the table 6 relative to the disk 4, will now be described with reference to FIG. 27 and FIG. 28.

First, the diameter $\Phi_1$ of the disk 4 is set to 120±0.3 mm, and the diameter $\Phi_2$ of its center hole 4a is set to 15+0.1 mm.

The diameter $\Phi_3$ of the effectively cylindrical outer circumferential surface 3c of the recess 3 of the tray 2 is set to approx. 123 mm.

Next, the minimum diameter $\Phi_4$ of the taper surface 6b at the tip of the centering piece 6a of the table 6 is set to 11.3 mm, and the maximum diameter $\Phi_5$ of the taper surface 6c at the base of the piece 6a is set to 15 ±0.1 mm (negative values are taken as 0).

Due to the aforesaid dimensioning, $$(15-11.3)/2=1.85 \text{ (mm)}$$

Therefore, even if the center $P_{11}$ of the disk 4 is shifted by a maximum of 1.85 mm with respect to the center $P_{10}$ of the table 6, the center hole 4a of the disk 4 can still be placed on the outer circumference of the centering piece 6a of the table 6.

Moreover, if the diameter $\Phi_3$ of the effectively cylindrical outer circumference 3a of the recess 3a of the tray 2 is set to approx. 123 mm, in the state prior to disk chucking shown in FIG. 27, the shift of the center $P_{11}$ of the disk 4 is 1.5 mm with respect to the center $P_{10}$ of the table 6. Then, during disk chucking shown in FIG. 28, there is a leeway of 1.8−1.5=0.3 (mm), the center hole 4a of the disk 4 fits easily and surely over the outer circumference 6a of the centering piece 6a of the table 6, and disk chucking of the disk 4 on the table 6 is performed reliably without any error.

Moreover, when the disk chucking operation shown in FIG. 28 is complete, an ample clearance $G_{10}$, i.e.

$$(123-120)/2=1.5 \text{ (mm)}$$

is maintained between the outer circumferential surface 4c of the disk 4 and the inner circumferential surface 3c of the recess 3 of the tray 2.

Therefore, even if the base unit 9 is floating elastically via the three insulators 119, 123 with respect to the chassis 111 in order to improve shock resistance as described hereintofore, there is no risk that the outer circumferential surface 4c of the disk 4, that is rotated together with the table 6 by the spindle motor 12, will unexpectedly come into contact with the inner circumferential surface 3c of the recess 3 of the tray 2 when the disk is played back, so the disk 4 can be rotated safely and with a high degree of stability. High precision reproduction of the disk 4 by the object lens 126 of the optical pickup 7 can therefore be performed.

This invention has been described in the case of one embodiment, however the invention is not limited to this embodiment, various modifications being possible based on the technical concepts presented therein.

The disk apparatus according to this invention described hereinabove, therefore has the following advantages.

In the disk apparatus according to this invention, when the apparatus is used vertically, the outer circumference of a disk inserted in a recess in a disk tray is held on its outer circumference by four pawls so that it can be loaded vertically in the apparatus. The four pawls are disposed at effectively symmetrical positions with respect to the center line in the width direction of the tray, the intervals between the four pawls with respect to the center of the recess are set such that the disk can be inserted in or removed from the recess by sliding it between the four pawls, and as the four pawls are fixed, the pawls can be formed in a one-piece construction with the tray. The construction and manufacture of the apparatus are therefore very simple, and the apparatus can be produced at low cost.

In the disk apparatus according to this invention, one apparatus can be used either horizontally or in two vertical directions. In particular, the apparatus can be stood vertically in a space inside a computer or other instrument, so space saving is achieved.

In the disk apparatus according to this invention, when the apparatus is used vertically, the outer circumference of the disk inserted in the recess in the disk tray is held on its outer circumference by a plurality of pawls so that it can be loaded vertically in the apparatus. At least one of this plurality of pawls can move freely between a position inside the recess and a position outside the recess. When the apparatus is used horizontally, this pawl is moved outside the recess so that when the disk is inserted in the recess, the pawl does not cause an obstruction. When the apparatus is used vertically, the pawl is moved inside the recess so as to hold the disk vertically in the recess. The apparatus is therefore convenient to use.

In the disk apparatus according to this invention, the outer circumference of the recess is effectively perpendicular to the base of the recess so that, when the apparatus is used vertically, the disk is held even more stably in the recess 3.

In the disk apparatus according to this invention, when the apparatus is used vertically, the outer circumference of the disk inserted in the recess in the disk tray is held on its outer circumference by a plurality of pawls so that it can be loaded vertically in the apparatus. The plurality of pawls are formed of elastic bodies, and as the pawls are bent against an elastic force when the disk is inserted in or removed from the recess, disk insertion and removal are simple.

In the disk apparatus according to this invention, the pawls formed of elastic bodies are provided at four points on the outer circumference of the recess such that they are effectively symmetrical with respect to the center line of the width direction of the tray. The apparatus may therefore be freely used in three directions, i.e. the horizontal direction and two vertical directions.

In the disk apparatus according to this invention, outer walls forming the outer circumference effectively perpendicular to the base of the recess, are formed in a one-piece construction as an elastic body with the plurality of pawls having elasticity. The outer circumference of the disk inserted in the recess is therefore protected by the outer walls having elasticity, and as the outer circumference of the recess forms an acute angle with the base of the recess, the disk is held even more stably and reliably in a vertical position when the apparatus is used vertically.

In the disk apparatus according to this invention, when the apparatus is used vertically, the outer circumference of the disk inserted in the recess in the disk tray is held on its outer circumference by a plurality of pawls so that it can be loaded vertically in the apparatus. When the diameter of the disk is approx. 120 mm and the diameter of its center hole is approx. 15 mm, the diameter of the outer circumferential surface of the recess in the tray is set to approx. 123 mm, the minimum diameter of the taper surface of the outer circumference of the centering piece of the disk table on which the center hole of the disk is fitted, is set to approx. 11 mm. Hence, after the disk has been loaded in the apparatus and chucked on the table, the center hole can be easily and reliably slid onto the outer circumference of the centering piece of the table, so that chucking is performed without error and with a high degree of reliability. Even after the chucking operation is complete, an ample space is left between the outer circumferential surface of the disk and the outer circumferential surface of the recess in the table so that when the disk is rotated, there is no risk that the outer circumferential surface of the disk may unexpectedly come into contact with the outer circumferential surface of the recess. The disk is therefore safely and stably rotated.

In the disk apparatus according to this invention, the base unit to which the disk table and optical pickup are fitted, is elastically supported in the body of the apparatus by a plurality of effectively cylindrical insulators. Deformation or displacement of these insulators in the X direction, which is the tracking direction of the optical pickup, is fully allowed, whereas deformation or displacement in the Z direction, which is the focusing direction, and the Y direction which is perpendicular to both the X and Z directions (tangential direction to the track recorded on the disk), are minimized. Damping of the base unit in the X direction is therefore adequate, whereas the displacement amount in the Y and Z directions is minimized. In this way, excess displacement of the base unit in the Y and Z directions when the apparatus is used vertically is prevented, hence contact of the disk with the tray and focusing errors are also definitively prevented so that reliability of the apparatus is greatly improved.

In the disk apparatus according to this invention, as deformation or displacement of the plurality of insulators in the X direction is fully allowed, high damping of external vibrations acting on the base unit (shock resistance) is obtained both when it is used horinzontally and when it is used vertically.

In the disk apparatus according to this invention, deformation or displacement of the plurality of insulators in the Y direction is minimized, so that even when the apparatus is used horizontally, there is very little play (leeway) of the base unit in the Y direction, and chucking onto the table of the disk that is mounted on the tray and loaded, is performed with higher reliability.

In the disk apparatus according to this invention, a pair of outer ribs are formed in a one-piece construction parallel to the Y and Z directions on the outer surface of each of the plurality of insulators. Deformation or displacement of this plurality of insulators in the Z direction is therefore minimized, construction of the insulators is simple, and their manufacture is easy.

In the disk apparatus according to this invention, a pair of inner ribs formed opposite each other from the Y direction, are respectively formed in a one-piece construction on the inside of the plurality of insulators. This pair of inner ribs comes into contact with a plurality of fixing screws respectively inserted in the plurality of insulators. Deformation or displacement in the Y direction is therefore minimized, construction of the insulators is simple, and their manufacture is easy.

In the disk apparatus according to this invention, a plurality of insulators is attached to support members by a plurality of fixing screws respectively inserted in the plurality of insulators. A plurality of effectively arc-shaped flanges formed on the base unit engage with recess grooves formed in-the middle, in an axial direction, of the outer circumferences of the plurality of insulators, and the pair of outer ribs are made to engage with a pair of rib grooves parallel to the Y direction respectively formed on the outer circumferences of the plurality of fixing flanges, so positioning of the insulators when the insulators are assembled is rendered easier and more accurate.

In the disk apparatus according to the invention, three points on the outer circumference of the base unit are elastically supported by the aforesaid three insulators. Deformation or displacement in the X, Y, Z directions of an insulator that supports one point at a position near the disk table, is arranged to be less than the deformation or displacement in the X, Y. Z directions of the insulators supporting the other two points. The point on the base unit whereupon the weight of the heavy spindle motor to which the table is attached acts, is therefore firmly and elastically supported by a single insulator, and the three points on the outer circumference of the base unit are supported by the three insulators stably and elastically in a well-balanced fashion.

What is claimed is:

1. A disk drive apparatus for driving a disk recording medium comprising:
    a disk table on which said disk recording medium is mounted;
    an optical pickup for emitting a laser beam to said disk recording medium;
    a base unit for holding said disk table and said optical pickup; and
    a plurality of insulators supporting said base unit comprising displacement minimizing means that maintains deformation or displacement in the X direction while minimizing deformation or displacement in the Y and Z directions, wherein said displacement means comprises a first outer rib integrally formed along a length of and projecting from a first side of the outer surface of each of said plurality of insulators and a second outer rib integrally formed along a length of and projecting from a second side of the outer surface of each of said plurality of insulators, said first side being separate from said second side,
    where a tracking direction of said optical pickup is the X direction, a focusing direction of said optical pickup is the Z direction, and a direction perpendicular to said X and Z directions is the Y direction, taking X, Y, Z as coordinate axes.

2. A disk drive apparatus for driving a disk recording medium comprising:
    a disk table on which said disk recording medium is mounted,
    an optical pickup for emitting a laser beam to said disk recording medium,
    a base unit for holding said disk table and said optical pickup, and
    a plurality of insulators supporting said base unit comprising displacement minimizing means that maintains deformation or displacement in the X direction while minimizing deformation or displacement in the Y and Z directions, wherein said displacement means comprises a pair of inner ribs formed on and projecting from the inside of each of said plurality of insulators, such that said inner ribs mutually oppose each other, said pair of inner ribs coming into contact with the lateral faces of a plurality of fixing screws respectively inserted in said plurality of insulators,
    where a tracking direction of said optical pickup is the X direction, a focusing direction of said optical pickup is the Z direction, and a direction perpendicular to said X and Z directions is the Y direction taking X, Y, Z as coordinate axes.

3. A disk drive apparatus as defined in claim 2 further comprising support members whereto said plurality of insulators are attached by said plurality of fixing screws,
    wherein a plurality of effectively arc-shaped flanges formed on said base unit are engaged with recess grooves formed in an axial mid portion on an outer circumference of said plurality of insulators, and said pair of outer ribs are engaged with a pair of rib grooves formed parallel to said Y direction on an inner surface of said plurality of flanges.

4. A disk drive apparatus as defined in claim 2, wherein said base unit is supported by three of said insulators at three points respectively, and the deformation or displacement in the X, Y and Z directions of the insulator supporting one of the three points closest to said disk table is arranged to be less than the deformation or displacement of the other two of said insulators supporting the two other points.

5. A disk drive apparatus for driving a disk recording medium, comprising:
    a disk table on which said disk recording medium is mounted;
    an optical pickup that emits a laser beam to said disk recording medium in a focusing direction and moves in a tracking direction;
    a base unit that holds said disk table and said optical pickup, and having a plurality of fixing flanges;
    a chassis; and
    a plurality of damping devices supporting said base unit on said chassis, each of said damping devices comprising:
        a hollow, elastic insulator having opposing ends each with an opening therein and a recess groove formed in a mid-portion of an outer surface thereof, said recess groove engaged with one of said fixing flanges,
        a fixing screw extending through said openings of said insulator with a first end having a flange engaged with said insulator adjacent one of said openings and a second end secured to said chassis adjacent the other of said openings, and
        rigidity increasing means formed on said insulator for selectively increasing rigidity of said insulator in the focusing direction and in a first direction that is perpendicular to said focusing and tracking directions, wherein said rigidity increasing means includes a first and a second outer rib formed parallel to said first direction on and projecting from first and second sides of the outer surface of said insulator, respectively, said first side being separate from said second side.

6. The disk drive apparatus of claim 5 wherein each of said fixing flanges is arc-shaped and has a pair of rib grooves formed parallel to said first direction on an inner surface thereof, said pair of outer ribs are engaged with said pair of rib grooves.

7. The disk drive apparatus of claim 5, wherein said base unit is supported by three of said damping devices at three points respectively, and the damping device that supports one of the three points that is closest to said disk table has an overall rigidity that is higher than the overall rigidity of the other two of said damping devices supporting the two other points.

8. A disk drive apparatus for driving a disk recording medium, comprising:
    a disk table on which said disk recording medium is mounted;
    an optical pickup that emits a laser beam to said disk recording medium in a focusing direction and moves in a tracking direction;
    a base unit that holds said disk table and said optical pickup, and having a plurality of fixing flanges;

a chassis; and a plurality of damping devices supporting said base unit on said chassis, each of said damping devices comprising:

a hollow, elastic insulator having opposing ends each with an opening therein and a recess groove formed in a mid-portion of an outer surface thereof, said recess groove engaged with one of said fixing flanges, a fixing screw extending through said openings of said insulator with a first end having a flange engaged with said insulator adjacent one of said openings and a second end secured to said chassis adjacent the other of said openings, and rigidity increasing means formed on said insulator for selectively increasing rigidity of said insulator in the focusing direction and in a first direction that is perpendicular to said focusing and tracking directions, wherein said rigidity increasing means includes a pair of inner ribs formed parallel to said first direction on and projecting from an inside surface of said insulator, each of said inner ribs facing a lateral face of said fixing screw to define a clearance gap therebetween, wherein under deflections of said insulator in the first direction, said inner ribs contact the lateral faces of said fixing screw.

9. The disk drive apparatus of claim 8, wherein said base unit is supported by three of said damping devices at three points respectively, and the damping device that supports one of the three points that is closest to said disk table has an overall rigidity that is higher than the overall rigidity of the other two of said damping devices supporting the two other points.

\* \* \* \* \*